(12) United States Patent
Perski et al.

(10) Patent No.: US 8,648,830 B2
(45) Date of Patent: Feb. 11, 2014

(54) NOISE REDUCTION IN DIGITIZER SYSTEM

(71) Applicant: N-trig Ltd., Kfar-Saba (IL)

(72) Inventors: Haim Perski, Hod-HaSharon (IL); Ori Rimon, Tel-Aviv (IL)

(73) Assignee: N-trig Ltd., Kfar-Saba (IL)

( * ) Notice: Subject to any disclaimer, the term of this patent is extended or adjusted under 35 U.S.C. 154(b) by 0 days.

(21) Appl. No.: 13/644,331

(22) Filed: Oct. 4, 2012

(65) Prior Publication Data
US 2013/0027361 A1    Jan. 31, 2013

Related U.S. Application Data

(63) Continuation of application No. 13/171,601, filed on Jun. 29, 2011, now abandoned, which is a continuation of application No. 11/063,535, filed on Feb. 24, 2005, now Pat. No. 7,995,036.

(60) Provisional application No. 60/547,772, filed on Feb. 27, 2004.

(51) Int. Cl.
*G06F 3/041* (2006.01)

(52) U.S. Cl.
USPC .................................. 345/173; 178/18.07

(58) Field of Classification Search
USPC ............ 345/173, 174, 177; 178/18.06, 18.03, 178/18.07
See application file for complete search history.

(56) References Cited

U.S. PATENT DOCUMENTS

| | | | |
|---|---|---|---|
| 4,398,720 A | 8/1983 | Jones et al. | |
| 4,591,710 A | 5/1986 | Komadina et al. | |
| 4,707,845 A * | 11/1987 | Krein et al. | 178/20.01 |
| 4,977,397 A | 12/1990 | Kuo et al. | |
| 5,129,654 A | 7/1992 | Bogner | |
| 5,528,002 A * | 6/1996 | Katabami | 178/19.06 |
| 5,543,588 A | 8/1996 | Bisset et al. | |

(Continued)

FOREIGN PATENT DOCUMENTS

| | | |
|---|---|---|
| EP | 0684580 | 11/1995 |
| EP | 1422601 | 5/2004 |

(Continued)

OTHER PUBLICATIONS

International Search Report and the Written Opinion Dated May 23, 2006 From the International Searching Authority Re.: Application No. PCT/IL05/00229.

(Continued)

*Primary Examiner* — Pegeman Karimi
*Assistant Examiner* — Chanh Nguyen

(57) ABSTRACT

A method for noise reduction in a digitizer includes determining a location of a stylus with a known frequency of emission over a first sampling period, sampling output from a plurality of detecting elements over a second sampling period, identifying detecting elements with sampled output in the second sampling period above a defined threshold in a selected frequency, the selected frequency being close to but different than the known frequency of the stylus, selecting as a candidate carrier of mere noise a detecting element from the detecting elements identified that is spaced away from the determined location of the stylus, and reducing values of output sampled over the second sampling period from at least one other detecting element, in accordance with the output sampled over the second sampling period from the detecting element selected as the candidate carrier of mere noise.

20 Claims, 16 Drawing Sheets

(56) References Cited

U.S. PATENT DOCUMENTS

| | | | |
|---|---|---|---|
| 5,574,262 | A | 11/1996 | Petty |
| 5,691,512 | A * | 11/1997 | Obi .......................... 178/18.04 |
| 5,825,345 | A | 10/1998 | Takahama et al. |
| 5,831,600 | A | 11/1998 | Inoue et al. |
| 5,841,078 | A | 11/1998 | Miller et al. |
| 5,854,881 | A | 12/1998 | Yoshida et al. |
| 5,859,392 | A | 1/1999 | Petty |
| 5,889,511 | A | 3/1999 | Ong et al. |
| 5,905,489 | A | 5/1999 | Takahama et al. |
| 5,923,320 | A | 7/1999 | Murakami et al. |
| 6,020,849 | A * | 2/2000 | Fukuzaki ...................... 342/374 |
| 6,081,259 | A | 6/2000 | Teterwak |
| 6,229,529 | B1 | 5/2001 | Yano et al. |
| 6,239,389 | B1 | 5/2001 | Allen et al. |
| 6,690,156 | B1 | 2/2004 | Weiner et al. |
| 2002/0089491 | A1 | 7/2002 | Willig |
| 2004/0027340 | A1 | 2/2004 | Muraoka et al. |
| 2004/0100450 | A1 | 5/2004 | Choi |
| 2004/0155871 | A1 | 8/2004 | Perski et al. |
| 2004/0160426 | A1 | 8/2004 | DeGroot et al. |
| 2004/0178995 | A1 | 9/2004 | Sterling |
| 2005/0189154 | A1 | 9/2005 | Perski et al. |
| 2005/0271259 | A1 | 12/2005 | Lorch et al. |
| 2011/0254807 | A1 | 10/2011 | Perski et al. |

FOREIGN PATENT DOCUMENTS

| | | |
|---|---|---|
| JP | 05-173698 | 7/1993 |
| JP | 07-311647 | 11/1995 |
| JP | 09-325852 | 12/1997 |
| JP | 10-031545 | 2/1998 |
| JP | 2002-207563 | 7/2002 |
| WO | WO 03/019346 | 3/2003 |
| WO | WO 2005/081631 | 9/2005 |

OTHER PUBLICATIONS

Communication Pursuant to Article 94(3) EPC Dated Jul. 19, 2012 From the European Patent Office Re. Application No. 05709125.8.
Notice of Allowance Dated Mar. 31, 2011 From the US Patent and Trademark Office Re.: U.S. Appl. No. 11/063,535.
Official Action Dated Jun. 5, 2012 From the US Patent and Trademark Office Re. U.S. Appl. No. 13/171,601.
Official Action Dated Dec. 8, 2009 From the US Patent and Trademark Office Re.: U.S. Appl. No. 11/063,535.
Official Action Dated Nov. 15, 2011 From the US Patent and Trademark Office Re. U.S. Appl. No. 13/171,601.
Official Action Dated Dec. 22, 2010 From the US Patent and Trademark Office Re.: U.S. Appl. No. 11/063,535.
Official Action Dated May 25, 2010 From the US Patent and Trademark Office Re.: U.S. Appl. No. 11/063,535.
Official Action Dated May 27, 2009 From the US Patent and Trademark Office Re.: U.S. Appl. No. 11/063,535.
Proceedings Further With the European Patent Application Pursuant to Rule 70(2) EPC Dated Apr. 13, 2012 From the European Patent Office Re. Application No. 05709125.8.
Response Dated Aug. 12, 2010 to Notification of Reasons of Rejection of May 21, 2010 From the Japanese Patent Office Re.: Application No. 2007-500353.
Response Dated Jan. 21, 2010 to Official Action of Dec. 8, 2009 From the US Patent and Trademark Office Re.: U.S. Appl. No. 11/063,535.
Response Dated Mar. 22, 2011 to Official Action of Dec. 22, 2010 From the US Patent and Trademark Office Re.: U.S. Appl. No. 11/063,535.
Response Dated Sep. 27, 2010 to Official Action of May 25, 2010 From the US Patent and Trademark Office Re.: U.S. Appl. No. 11/063,535.
Supplementary European Search Report Dated Mar. 27, 2012 From the European Patent Office Re. Application No. 05709125.8.
Translation of Decision of Rejection Dated Jun. 2, 2011 From the Japanese Patent Office Re.: Application No. 2007-500353.
Translation of Notification of Reasons of Rejection Dated May 21, 2010 From the Japanese Patent Office Re.: Application No. 2007-500353.
Communication Pursuant to Article 94(3) EPC Dated Jun. 20, 2013 From the European Patent Office Re. Application No. 05709125.8.
Communication Pursuant to Article 94(3) EPC Dated Nov. 13, 2012 From the European Patent Office Re. Application No. 05709125.8.
Communication Pursuant to Article 94(3) EPC Dated Nov. 22, 2013 From the European Patent Office Re. Application No. 05709125.8.

* cited by examiner

NOISE REDUCTION IN DIGITIZER SYSTEM

RELATED APPLICATIONS

This application is a continuation of U.S. patent application Ser. No. 13/171,601 filed on Jun. 29, 2011, which is a continuation of U.S. patent application Ser. No. 11/063,535 filed on Feb. 24, 2005, now U.S. Pat. No. 7,995,036, which claims the benefit of priority under 35 USC §119 (e) of U.S. Provisional Patent Application No. 60/547,772 filed on Feb. 27, 2004. The contents of the above applications are all incorporated herein by reference.

FIELD AND BACKGROUND OF THE INVENTION

The present invention relates to noise reduction in a system comprising a digitizer and, more particularly, but not exclusively to noise reduction in a system comprising a digitizer associated with a display screen.

U.S. Pat. No. 6,690,156 "Physical Object Location Apparatus and Method and a Platform using the same" assigned to N-trig Ltd, and U.S. patent application Ser. No. 10/649,708 "Transparent Digitizer" also assigned to N-trig Ltd, describe a positioning device capable of detecting multiple physical objects, preferably styluses, located on a flat screen display. One of the preferred embodiments in both patents describes a system built of transparent foils containing a matrix of vertical and horizontal conductors. In one embodiment the stylus includes a passive resonance circuit, which is triggered by an excitation coil that surrounds the foils. The stylus is excited at a predetermined range of frequencies depending on the capacitance and inductance of the resonant circuit. Other embodiments may include a different kind of EM stylus. The exact position of the stylus is determined by processing the signals that are sensed by the matrix of horizontal and vertical conductors.

Existing digitizer systems use several noise removal methods to improve the detection precision. For example the received signal is processed through a band pass filter leaving a window of frequencies including the stylus frequency. The filtered signal may then be passed through a Fourier transform selecting the single frequency of the stylus.

Elements that induce an equal amount of noise on each conductive line regardless of the line location may then be eliminated through the use of differential amplifiers. For example, objects that are far enough from the sensor will have the same effect on all the sensor lines.

There are other examples of noise reduction methods that do not eliminate noise at the stylus frequency.

Using the various prior art systems, much of the noise is removed, but one element of noise necessarily remains because it cannot be identified and filtered out and that is noise that is at the same frequency as the stylus.

Preferred Application

The preferred application to which the embodiments to be described hereinbelow are applicable is a transparent digitizer for a mobile computing device that uses a flat panel display (FPD) screen. The digitizer detects the position of one stylus at a very high resolution and update rate. The stylus is used for pointing, painting, writing (hand write recognition) and any other activity that is typical for a stylus. The digitizer supports full mouse emulation. As long as the stylus hovers above the FPD, a mouse cursor follows the stylus position. Touching the screen stands for left click and a special switch located on the stylus emulates right click operation.

The application may utilize a passive EM stylus. External excitation coils that surround the sensor are utilized to energize the stylus. However, other versions may include an active stylus, battery operated or wire connected, which does not require external excitation circuitry.

In one application the electromagnetic object responding to the excitation is a stylus. However, other embodiments may include other physical objects comprising a resonant circuit or active oscillators, such as gaming pieces. Applications describing gaming tokens comprising resonant circuits are described in U.S. Pat. No. 6,690,156 ("physical object location apparatus and method and a platform using the same").

In the preferred application, the digitizer can detect simultaneous and separate inputs from an electromagnetic stylus and a user finger. Hence, it is capable of functioning as a touch detector as well as detecting a stylus. However, other embodiments may include a digitizer capable of detecting only an electromagnetic stylus.

In a preferred application, the stylus supports full mouse emulation. However, in different applications the stylus could support additional functionality such as an Eraser, change of color, etc. In other embodiments the stylus could be pressure sensitive and changes its frequency or changes other signal characteristics in response to user pressure.

In a preferred application, the mobile device is an independent computer system having its own CPU. In different embodiments the mobile device might only be a part of system such as a wireless mobile screen for a Personal Computer.

In a preferred application, the digitizer is integrated into the host device on top of the FPD screen. In additional application the transparent digitizer can be provided as an accessory that could be placed on top of a screen. Such a configuration can be very useful for laptop computers, which are already in the market in very large numbers. Such systems can turn a laptop into a powerful device that supports hand writing, painting or any other operation enabled by the transparent digitizer.

In a preferred application, the digitizer supports one stylus. However, in different applications more than one stylus may operate simultaneously on the same screen. Such a configuration is very useful for entertainment application where multiple users can paint or write to the same paper-like screen.

In one application, the digitizer is implemented on a set of transparent foils. Alternatively such a digitizer may be implemented using either a transparent or a non-transparent sensor. One example is a Write Pad device, which is a thin digitizer that is placed below normal paper. In this example, the stylus combines real ink with electro magnetic functionality. The user writes on the normal paper and the input is simultaneously transferred to a host computer to store or analyze the data.

An additional example of a non-transparent sensor is an electronic entertainment board. The digitizer, in this example, is mounted below the graphic image of the board, and detects the position and identity of gaming figures that are placed on top the board. The graphic image in this case is static, but it could be manually replaced from time to time (such as when switching to a different game).

In some applications a non-transparent sensor could be integrated in the back of a FPD. One example for such an embodiment is an electronic entertainment device with a FPD display. The device could be used for gaming, in which the digitizer detects the position and identity of gaming figures. It could also be used for painting and/or writing in which the digitizer detects one or more styluses. In most cases, a configuration of non-transparent sensor with a FPD will be used when high performance is not critical for the application.

Technical Description

Transparent Digitizer

A preferred digitizer allows for the location and identification of physical objects, such as styluses and user's fingers. Identifying the location of the physical objects is sensed by an electro magnetic transparent digitizer that is mounted on top of a display. The transparent digitizer is described in U.S. Pat. No. 6,690,156 and detailed in U.S. patent application Ser. No. 10/649,708.

The various components and functionality manner of the transparent digitizer are as follows.

Sensor

In the preferred digitizer, the sensor is a grid of conductive lines made of conductive materials, such as ITO or conductive polymers, patterned on a transparent foil or substrate. For further information please refer to U.S. patent application Ser. No. 10/649,708, sub-heading: "Sensor", the contents of which are hereby incorporated herein by reference.

Front End

In the preferred digitizer the Front end is the first stage where sensor signals are processed. Differential amplifiers amplify the signals and forward them to a switch, which selects the inputs to be further processed. The selected signal is amplified and filtered by a filter & amplifier prior to sampling. The signal is then sampled by an A2D and sent to a digital unit via a serial buffer. For further information please refer to U.S. patent application Ser. No. 10/649,708, under the heading "Front end", the contents of which are hereby incorporated by reference herein.

Digital Unit

In the preferred digitizer the digital unit functions as follows: The front-end interface receives serial inputs of sampled signals from the various front-ends and packs them into parallel representation. A processing unit, such as a DSP core or a processor, which performs the digital unit processing, reads the sampled data, processes it and determines the position of the physical objects, such as stylus or finger. The Digital unit can be embedded in an ASIC component. The calculated position coordinates are sent to the host computer via link. For further information please refer to subheading: "Digital unit" in U.S. patent application Ser. No. 10/649,708, the contents of which are hereby incorporated by reference.

Detector

The detector consists of the digital unit and the Front end.

Detection of Stylus

The preferred digitizer utilizes a passive electromagnetic (EM) stylus. The stylus comprises two main sections; the first section is an energy pick-up circuit and the second section is an active oscillator which is coupled to the stylus tip. An external excitation coil that surrounds the sensor supply energy to the energy pick up circuit. The received energy is transferred to the active oscillator through a rectifying component such as a diode bridge. The exact position of the stylus is determined by the detector, which processes the signals sensed by the sensor. In the preferred embodiment only the electric wave of the electromagnetic signal generated by the stylus is utilized. However, other embodiments may utilize the magnetic portion in addition or instead of the electric wave. For further information please refer to U.S. patent application Ser. No. 10/649,708 assigned to N-trig, and US provisional patent application "Electromagnetic Stylus for a Digitizer System" filed December 2004, also assigned to N-trig, the contents of both applications are hereby incorporated by reference.

In the preferred digitizer, the basic operation cycle consists of windowing, FFT/DFT, peak detection, interpolation, filtering and smoothing. For further information please refer to U.S. patent application Ser. No. 10/649,708, sub-title: "Algorithms".

Noise Sources

There may be a variety of noise sources in the stylus frequency range. The most common signals interfering with the stylus signals are signals that originate from conductive objects, such as a user finger, touching the screen. FIG. 1 is an electrical equivalent of a user finger touching one of the digitizer's antennas. When the user touches an antenna 11 a capacitance 12 is formed between the finger and the sensor conductors.

The noise situation is best explained with respect to finger induced noise signals.

There are two main scenarios that cause finger induced signals—

1. When the system is not connected to the common ground, electrical network vibrations lead to system oscillations 10 in reference to the ground. Since the user's body is not oscillating, the capacitance 12 between the user's finger and the system induces leakage current 13 through the user's finger to the ground.

2. When the user's body is subjected to electromagnetic interferences from the environment, it, and any associated finger, oscillates in reference to the system; as a result a leakage current is induced from the user's finger to the conductive antennas.

In both cases, the digitizer senses a leakage current originating from the user touching the sensor. When the leakage current induces a signal that is at the same frequency of the stylus, the leakage current can be mistaken for a stylus signal.

A second possible source of noise is the electronic components within the system, which radiate at many frequencies. These components may induce noise signals at the stylus frequency; thus interfering with stylus detection. Electronic devices placed in proximity to the system, such as cellular phones, may also radiate in frequencies that interfere with the stylus detection.

FIG. 2 is an example of a noise and stylus affecting the sensor at the same time. In this case the noise source is the user's finger touching the screen. The sensor 20 comprises a matrix of conductive lines. When stylus tip 21 is present at the surface of the sensor it affects the antennas in its proximity. One or more antennas in proximity to the stylus may suffer noise signals induced by a finger 22 touching the sensor. For example, antenna 23 exhibits signals induced by both stylus 21 and finger 22.

Erroneous Stylus Detection

In a digitizer of this kind, the stylus detection comprises two detection steps. The first step is to find the antenna exhibiting the maximum stylus signal. The second step is calculating the stylus position by interpolating the signals on the maximum signal antenna and its surrounding antennas.

A digitizer system designed to detect an electromagnetic stylus may suffer from two kinds of problems. The first kind is when the unwanted signals are stronger then the stylus signals, thus interfering with the first detection step. In this case the digitizer system should sample and employ the noise removal algorithm on all the antennas in order to reveal the antenna exhibiting the maximum stylus signal.

Reference is now made to FIG. 3, which describes a case when a user's finger 22 touching the screen induces a stronger signal 33 than the stylus 21, causing the digitizer to mistake the finger for the stylus. As a result the digitizer chooses the wrong antennas for interpolation.

The second kind of problem is when the stylus signal is stronger than the finger-induced signal. However, an error in the stylus detection may still occur during the interpolation step of the detection. FIG. 4, to which reference is now made, describes a case when a user's finger 22 touching the screen induces a signal that causes the digitizer to miscalculate the stylus position 34. The user finger 22 induces a signal on one of the X axis antennas 31 while the stylus 21 is located closer to a different X axis antenna 32. The signal received on the stylus antenna 32 is weaker than the signal 33 received on the finger antenna 31. Hence, the digitizer will miscalculate the stylus position 34.

The object of the present invention is to solve both cases and eliminate noise above and below the level of the stylus signal.

There is thus a widely recognized need for, and it would be highly advantageous to have, a noise reduction system devoid of the above limitations.

SUMMARY OF THE INVENTION

According to one aspect of the present invention there is provided a method for noise reduction in a digitizer, the digitizer comprising a plurality of detecting elements for detecting an electromagnetic signal at one of a number of predetermined frequencies: the method comprising:

sampling at least two of the detecting elements substantially simultaneously to obtain outputs therefrom, and reducing the output on one of the two elements in accordance with the output on the other of the elements.

Preferably, one of the at least two elements is selected as a candidate carrier of a stylus signal and the other of the at least two elements is selected as a candidate carrier of mere noise.

The method preferably comprises detecting at each of the elements the one predetermined frequency and another arbitrary frequency.

The method preferably comprises utilizing the arbitrary frequency to estimate the amount of noise at the predetermined frequency.

The method preferably further comprises:

determining a ratio between signals of the one predetermined frequency and the arbitrary frequency at the candidate carrier of mere noise, from the ratio and the arbitrary signal at the candidate carrier of the stylus signal determining an amount of noise at the one predetermined frequency, and reducing a signal at the one predetermined frequency at the candidate carrier of a stylus signal by the determined amount of noise.

Preferably, the arbitrary frequency is selected as a frequency within a preset detection range having a relatively high noise.

Preferably, the digitizer is also for touch detection and the arbitrary frequency is selected as a frequency already used for the touch detection.

The method preferably further comprises deliberately generating noise at the arbitrary frequency.

Preferably, the predetermined frequency is changed to a new frequency during use, the method comprising changing the arbitrary frequency from a frequency relatively close to the predetermined frequency to a second frequency relatively close to the new frequency.

Preferably, the candidate carrier of mere noise is selected from a group of elements exhibiting more than a threshold amount of noise, as the element in the group which is furthest away from a stylus previously known location.

Alternatively, the candidate carrier of mere noise may be selected as an element exhibiting a strongest noise signal as long as it is beyond a determined distance from a stylus previously known location.

Alternatively, the candidate carrier of mere noise is arbitrarily selected, noise subtraction is carried out over a group of elements on the basis of the selection being correct, a resulting signal pattern over the group of elements is analyzed, and the arbitrary selection is allowed if the resulting signal pattern is indicative of a correct selection, otherwise a new arbitrary selection is made.

The method may comprise using as patterns indicative of a correct selection a first pattern indicative of a stylus at one of non-selected elements, and a second pattern indicative of no stylus being present.

The method may comprise verifying the presence of a stylus before carrying out the reduction.

The method may comprise verifying the presence of a stylus, before carrying out the reduction, by comparing magnitudes at the arbitrary frequency and magnitudes at the predetermined frequency.

In one preferred embodiment:

the candidate carrier of mere noise is arbitrarily selected, noise subtraction is carried out over a group of antennas on the basis of the selection being correct, a resulting signal pattern over the group of antennas is analyzed, and the arbitrary selection is rejected if the resulting signal pattern is indicative of an incorrect selection, and a new arbitrary selection is made.

The method may comprise using as a pattern indicative of an incorrect selection a pattern indicative of a stylus at or near the selected candidate.

The method may comprise using a complex proportion to compensate for at least one of phase and magnitude differences between respective antennas during the compensating.

The method may comprise sampling a group of antennas of an array, selecting at least one antenna which is least affected by the stylus and reducing respective outputs of at least some remaining antennas in accordance with the output of the selected antenna.

The method may comprise using a plurality of arbitrarily selected frequencies to calculate the reduction.

The method may comprise using an average output of the plurality of arbitrarily selected frequencies to calculate the reduction.

Preferably, the detecting elements are conductive detectors of a flat array of the digitizer for digitizing signals of a movable object to indicate location of the object.

Preferably, the noise is at least in part a consequence of the presence of a finger.

Preferably, the digitizer comprises a detection surface for carrying the detecting elements, the detection surface further being touch sensitive.

According to a second aspect of the present invention there is provided apparatus for noise reduction in a digitizer, the digitizer comprising a plurality of detecting elements for detecting an electromagnetic signal at one predetermined frequency of a plurality of predetermined frequencies: the apparatus comprising:

a sampler for sampling at least two of the detecting elements substantially simultaneously to obtain outputs therefrom, and a noise reduction unit for reducing the output on one of the two detecting elements in accordance with the output on the other of the detecting elements.

Preferably, one of the detecting elements is selected as a candidate carrier of a stylus signal and the other of the detecting elements is selected as a candidate carrier of mere noise.

The apparatus may comprise a frequency detector for detecting outputs at each of the detecting elements at the predetermined frequency and another arbitrary frequency.

The apparatus may comprise
a ratio finder for determining a ratio between outputs at the predetermined frequency and the arbitrary frequency at the candidate carrier of mere noise,
and wherein the noise reduction unit is operable with the ratio finder to:
determine from the ratio and the arbitrary signal at the candidate carrier of the stylus signal determining an amount of noise at the predetermined frequency, and
reduce the output at the predetermined frequency at the candidate carrier of a stylus signal by the determined amount of noise.

Preferably, the detecting elements are transparent conductors.

Preferably, the arbitrary frequency is selected as a frequency within a preset detection range having a relatively high noise.

Preferably, the arbitrary frequency is selected as a frequency already used for finger detection.

The apparatus may comprise a noise generator for deliberately generating noise at the arbitrary frequency Preferably, the predetermined frequencies are liable to change during use, the apparatus accordingly being configured to change the arbitrary frequency from a frequency relatively close to a first predetermined frequency to a second frequency relatively close to a second predetermined frequency.

Preferably, the candidate carrier of mere noise is selected from a group of detection elements exhibiting more than a threshold amount of noise, as the element in the group which is furthest away from a stylus previously known location.

Preferably, the candidate carrier of mere noise is selected as an element exhibiting a strongest noise signal as long as it is beyond a determined distance from a stylus previously known location.

In an embodiment, the candidate carrier of mere noise is arbitrarily selected or otherwise chosen, say using a selection algorithm,
noise subtraction is carried out over a group of elements on the basis of the selection being correct,
a resulting signal pattern over the group of elements is analyzed, and
the arbitrary selection is allowed if the resulting signal pattern is indicative of a correct selection, otherwise a new selection is made.

The apparatus may comprise using as patterns indicative of a correct selection a first pattern indicative of a stylus at one of non-selected elements, and a second pattern indicative of no stylus being present.

The analysis may comprise determining a number of elements wherein an output exceeds a predetermined threshold.

In an alternative embodiment, the candidate carrier of mere noise is arbitrarily selected,
noise subtraction is carried out over a group of elements on the basis of the selection being correct,
a resulting signal pattern over the group of elements is analyzed, and the arbitrary selection is rejected if the resulting signal pattern is indicative of an incorrect selection, and a new arbitrary selection is made.

The apparatus may comprise at least one of a phase compensator and a magnitude compensator using a complex proportion to compensate for at least one of phase and magnitude differences between respective elements during the compensating.

Preferably, the elements comprise an array, the apparatus configured to sample at least some elements of the array, the noise reduction unit being configured to choose at least one element and reduce respective outputs of at least some remaining elements in accordance with the output of another of the elements.

Preferably, the noise reduction unit is configured to use a plurality of arbitrarily selected frequencies to calculate the reduction.

Preferably, the noise reduction unit is configured to use an average noise level of the plurality of arbitrarily selected frequencies to calculate the reduction.

Preferably, the elements are conductive detectors of a flat array of the digitizer for digitizing signals of a movable object to indicate location of the object.

Preferably, the movable object is a stylus.

Preferably, the stylus is an electromagnetic stylus.

Preferably, the stylus comprises an active oscillator and an energy pick up circuit.

Preferably, the stylus comprises a resonance circuit.

Preferably, the detecting elements are arranged in a grid array.

Preferably, the detecting elements are loop elements.

Preferably, the noise is at least in part a consequence of the presence of a finger.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
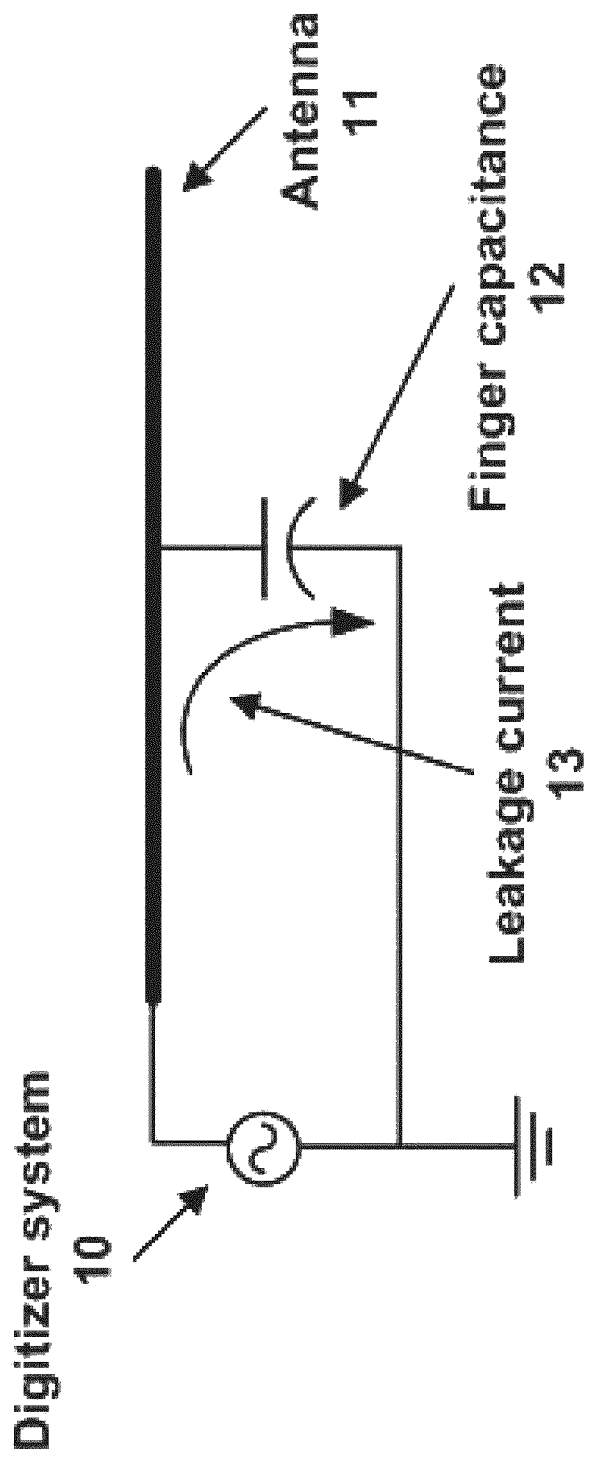
FIG. 1 is a simplified diagram showing a theoretical equivalent circuit of a finger on a digitizer surface.
Figure 2:
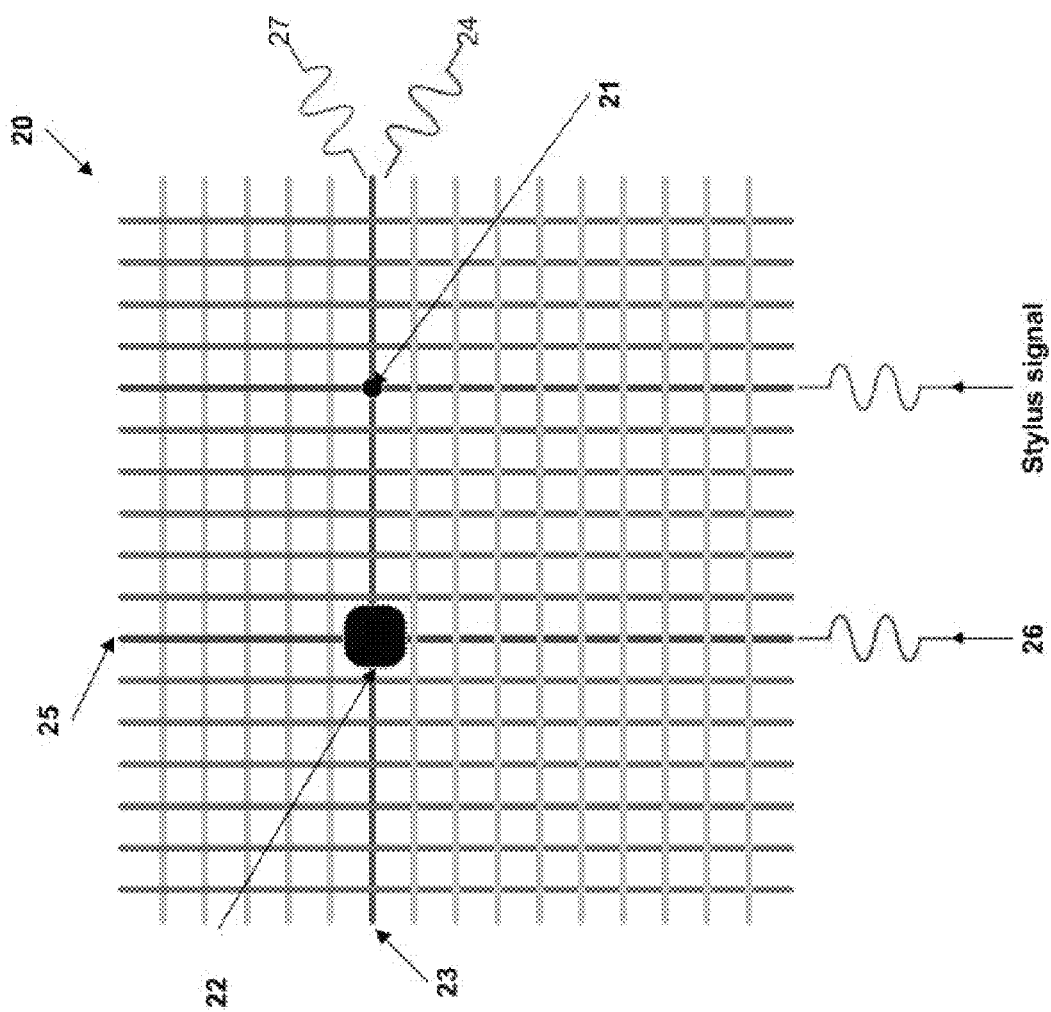
FIG. 2 is a simplified diagram showing a sensor array of a digitizer circuit with a finger at one location and a stylus at another location.
Figure 3:
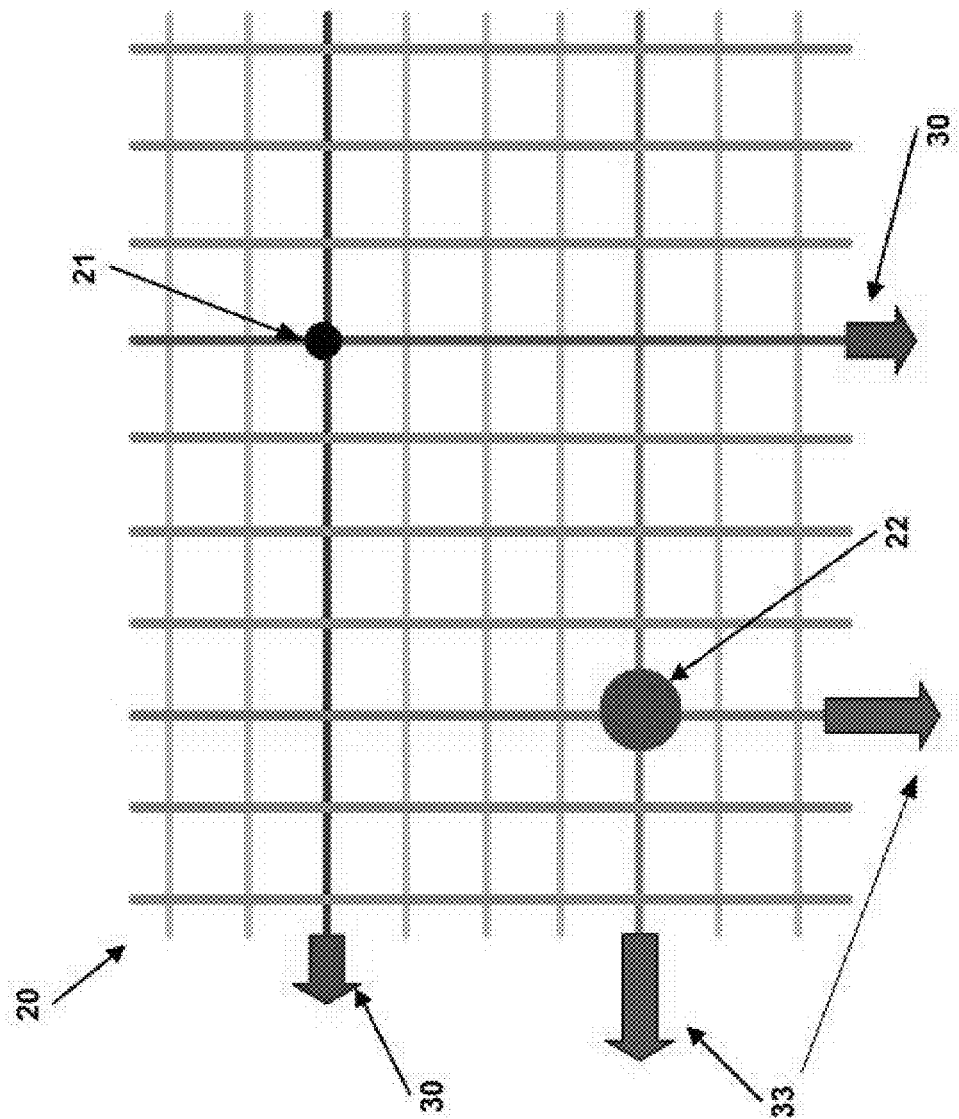
FIG. 3 is a simplified diagram showing the sensor array of FIG. 2 in which an erroneous detection is made.
Figure 4:
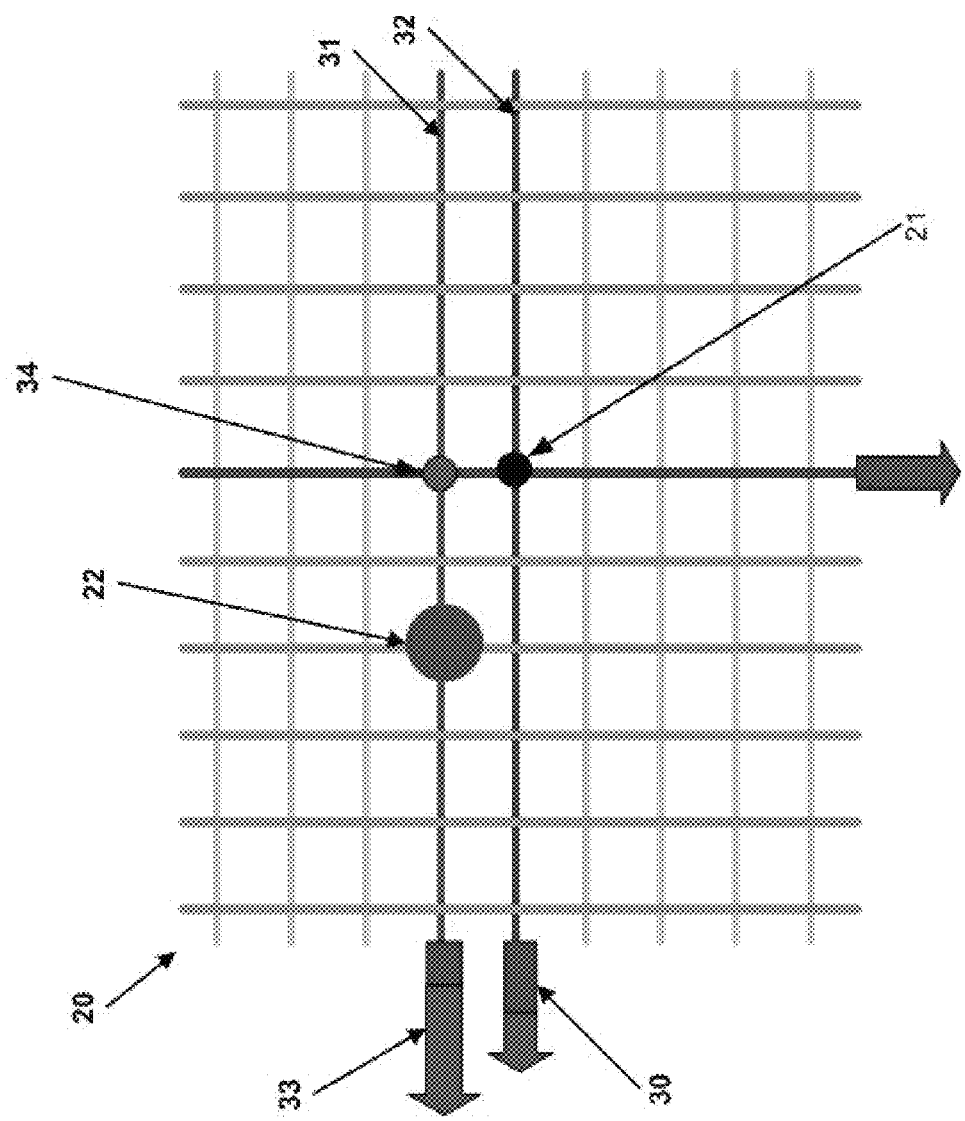
FIG. 4 is a simplified diagram illustrating the sensor array of FIG. 2 in an alternative scenario in which an erroneous detection is made.

The present embodiments comprise a noise reduction system for stylus detection in a digitizer. More particularly, the present embodiments comprise a system for noise identification and reduction at the signal frequency being used for detection of the stylus. It is noted that if the digitizer is combined with a touch detector, then the finger involved in touch detection is likely to be a source of noise specifically at the stylus detection frequency.

Such noise reduction specifically at the detection frequency may thus improve the detection of an electromagnetic stylus in a digitizer system. The digitizer is a computer associated input device capable of tracking user interactions via the stylus or other locatable objects. In general the digitizer is associated with a display screen, on which the results of stylus detection may be displayed. The digitizer may further enable touch detection.

The present invention does not require that the digitizer be placed directly on the display screen. Rather, it is applicable both to transparent digitizers where the stylus is moved over the display screen and to other types of stylus, which are moved over tablets or paper or whiteboards.

The present invention further applies to any kind of stylus or other pointer device which has a detection frequency and not merely to a passive electromagnetic stylus. The noise reduction algorithm described herein can be implemented on any digitizer system capable of tracking one or more electromagnetic styluses. The present invention is furthermore applicable in systems designed to detect both stylus and touch interactions, as will be explained hereinbelow.

The preferred embodiments are able to identify noise at the stylus frequency, as will be explained below, and subtract the identified noise from the stylus signals, to leave the stylus signals as the only source of output at the stylus frequency.

It is noted that whilst the digitizer is designed to detect an electromagnetic stylus, other conductive objects touching the screen may induce noise that can interfere with the stylus signal. Conventional noise removal methods, such as band pass filters and Fourier transform are often used to filter unwanted signals from the stylus signal. However, these methods can not remove unwanted signals at the same frequency as the stylus, and, as mentioned above, a high percentage of the output at the desired frequency can be due to such induced noise.

The principles and operation of a noise reduction system according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 5:
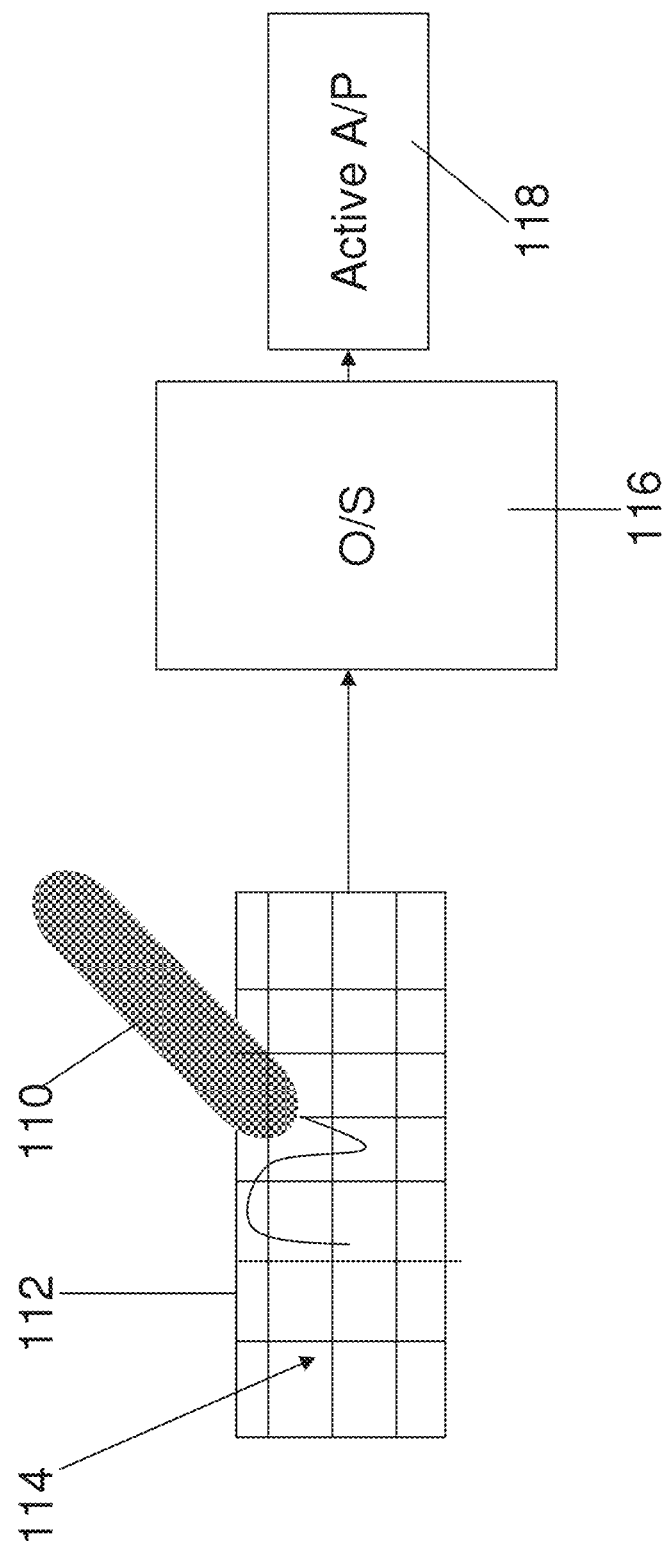
FIG. 5 is a simplified diagram illustrating a digitizer suitable for use with a preferred embodiment of the present invention.

Reference is now made to FIG. 5, which illustrates a simple digitizer. As mentioned, a digitizer is a device which detects the movement of an object such as a stylus and converts it into a digital signal which can be made available to software applications. A stylus or other pointing object 110 is moved over a surface 112. Detectors 114 within the surface 112 detect the current position of the pointer and send an output signal indicating that location to operating system 116 of a computer. The operating system ensures that the location information is made available to currently active application 118, so that the application knows where the pointer is and can incorporate the position into its current operation.

Figure 6:
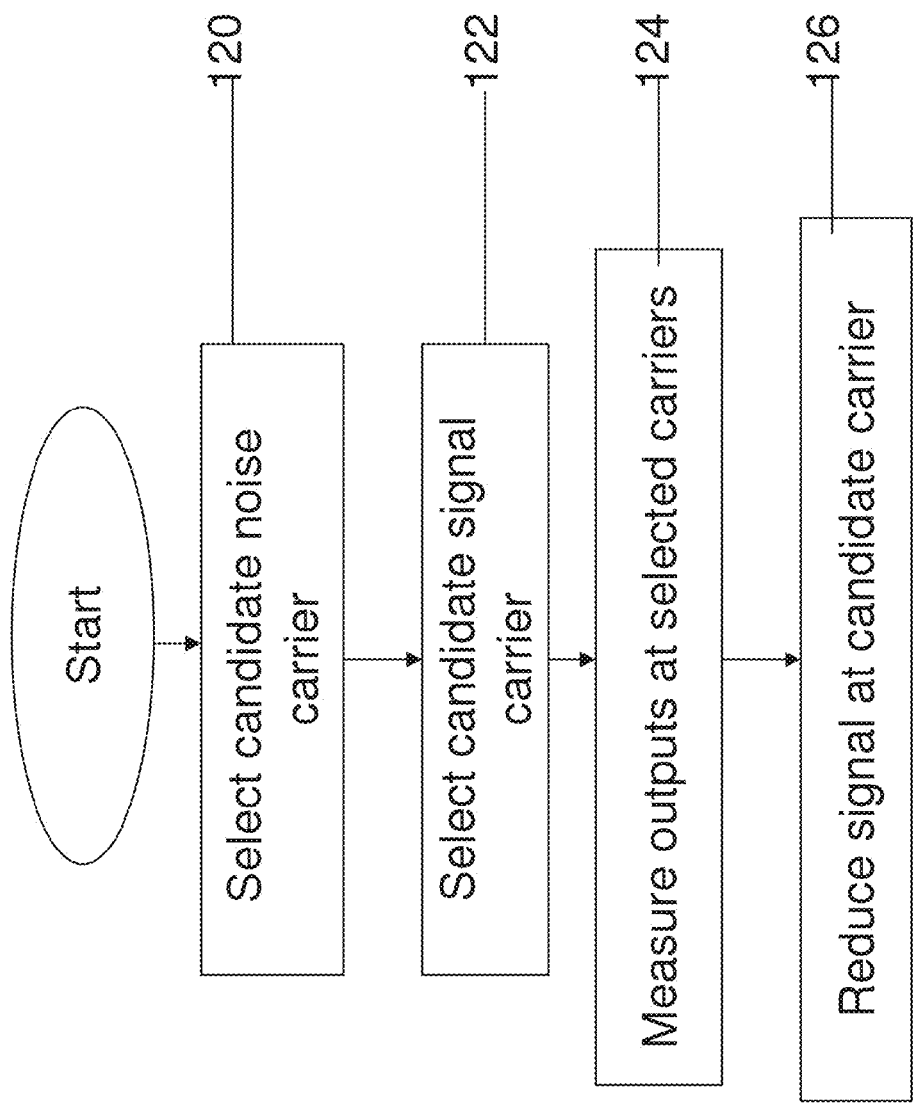
FIG. 6 is a simplified flow diagram illustrating a procedure in accordance with a first preferred embodiment of the present invention.

Reference is now made to FIG. 6, which is a simplified diagram illustrating the basic principle behind noise reduction according to the present embodiments. The digitizer as shown in FIG. 5 has several detecting elements which between them detect signals from the stylus. In a world without noise the detectors having the strongest signal would be taken as the location of the stylus. If two detectors give strong signals then the location of the stylus may be taken as being somewhere between them.

The real world has noise. Much of the noise is at frequencies other than the detection frequency being used by the stylus and can therefore be removed simply by filtering or like techniques referred to in the background. However, filtering cannot be used for the frequency being used by the stylus. In the process shown in FIG. 6, two detecting elements are read at the same time at the frequency used by the stylus. Then the output obtained at one of the elements is subtracted from the output at the other element.

It will be appreciated that if one of the elements is an element currently detecting a combination of stylus and noise output, and the other element is an element currently detecting only noise, then by obtaining the difference between the two signals one obtains a pure stylus detection signal. The method therefore preferably includes initial stage 120 of selecting an element as a candidate carrier of pure noise and a stage 122 of selecting another element as a candidate carrier of the stylus signal. Several methods of selecting these candidates will be discussed hereinbelow. The outputs are measured at the two elements in stage 124. As will be explained below, more than two candidates may be used in practice. Finally in stage 126, the output at the candidate carrier of the stylus signal is reduced in accordance with the noise detection at the other element. It is pointed out that the above applies to an "ideal" digitizer, where all the antennas and amplifiers are exactly the same. In such a case one can take the noise output from one antenna and subtract it from a second antenna. Such a simplified solution can be implemented in cases such as that of FIG. 11 which will be described below.

Figure 7:
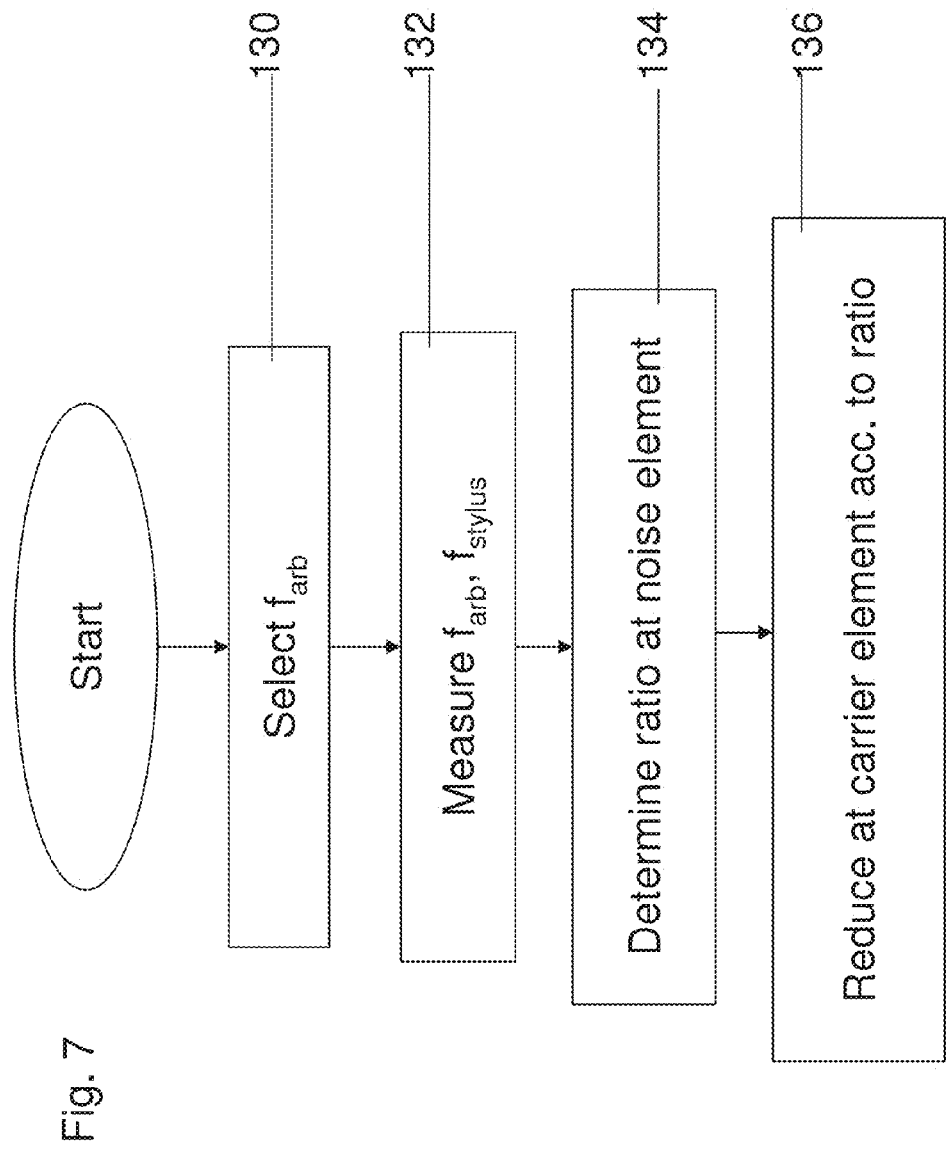
FIG. 7 is a simplified flow diagram illustrating in greater detail the procedure shown in FIG. 6, according to a further preferred embodiment of the present invention.

Reference is now made to FIG. 7, which is a simplified flow chart illustrating preferred outputs that can be used at the two carriers to obtain the necessary reduction. In stage 130, an arbitrary frequency is selected which is close to the frequency being used by the stylus so that noise levels at the two frequencies may be expected to be related. In stage 132 the outputs of both elements are measured at the two frequencies. In stage 134 a ratio is determined between the outputs at said two frequencies at the noise carrying element. In stage 136 that ratio is used to reduce the signal at the stylus frequency at the stylus carrying element.

Figure 8:
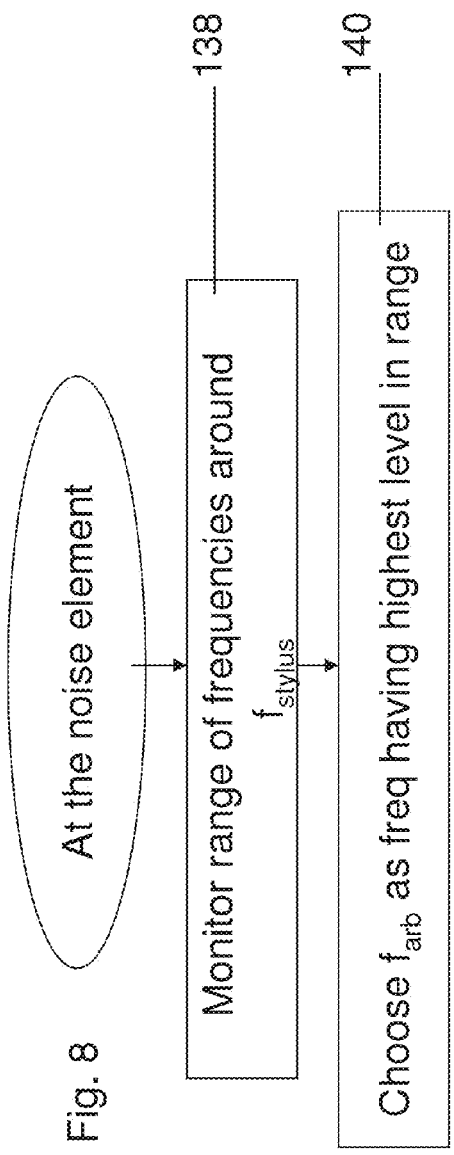
FIG. 8 is a simplified diagram illustrating a method of selecting an arbitrary frequency according to one preferred embodiment of the present invention.

In one preferred embodiment the arbitrary frequency is chosen using the procedure shown in the flow chart of FIG. 8. A range of frequencies around the stylus frequency is monitored in stage 138. Then, in stage 140, the arbitrary frequency is chosen as the frequency having the highest output level.

In an alternative embodiment, the digitizer is additionally used for touch detection and a given frequency is used for touch detection. In such an embodiment a frequency that can usefully be selected as the arbitrary frequency is the frequency already being used for touch detection.

In one embodiment, it is possible to use the detection elements or other parts within the digitizer system to deliberately generate noise at the arbitrary frequency.

It is noted that in the case of a single stylus using a single frequency at all times, the arbitrary frequency may be fixed. But in many embodiments the stylus may change its frequency during use. For example the frequency may change in order to indicate particular states of the stylus. In such a case the arbitrary frequency may also be changed.

Figure 9:
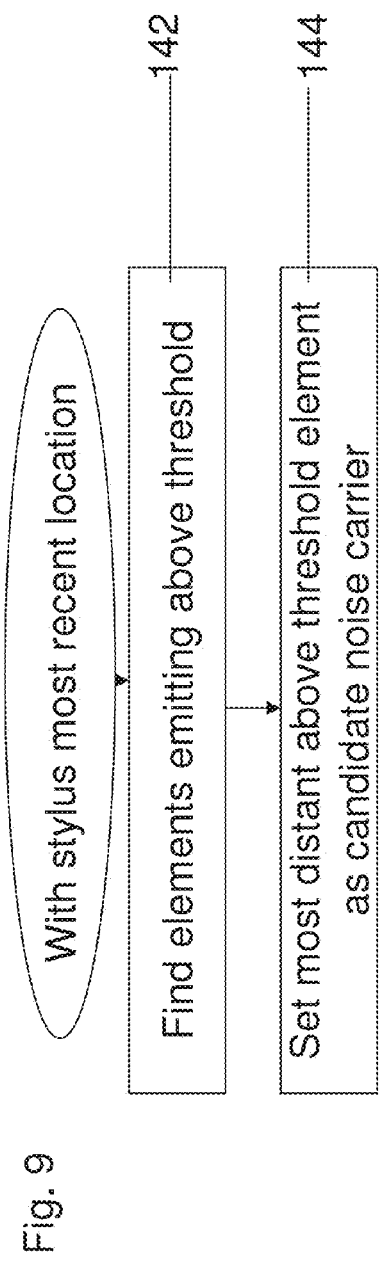
FIG. 9 is a simplified diagram illustrating a method of selecting a candidate carrier of pure noise according to a preferred embodiment of the present invention.

Reference is now made to FIG. 9, which is a simplified diagram showing how a candidate carrier of mere noise may be selected. In FIG. 9 the stylus's most recent position is known, so it is assumed that the current position is relatively close to that most recent position. In stage 142, measurements are taken to determine all of the detecting elements that are currently emitting an output at the arbitrary frequency which exceeds a threshold signal level. There is thus established a group of elements emitting above the threshold. In stage 144 the one element in the group that is furthest away from the stylus's most recently known position is selected as the candidate carrier of mere noise.

In a variation of stage 144, the candidate carrier of mere noise is selected as that element exhibiting a strongest noise signal, as long as it is beyond a determined distance from the previously known stylus location.

Figure 10:
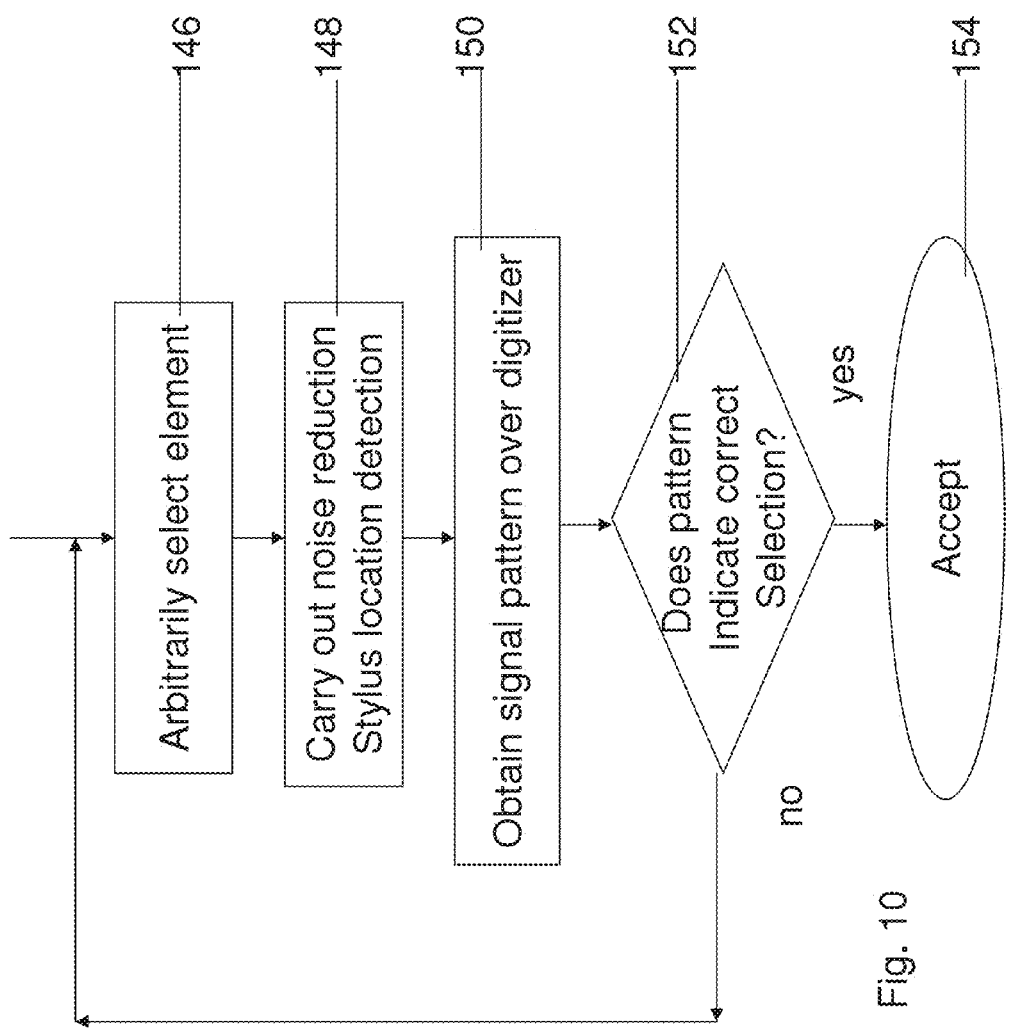
FIG. 10 is a simplified flow diagram illustrating a second method of selecting a candidate carrier of pure noise according to another preferred embodiment of the present invention.

Reference is now made to FIG. 10, which illustrates a more general method of finding a candidate carrier of mere noise which does not rely on having a recent stylus location. The method of FIG. 10 may be used at all times or may be substituted for the method of FIG. 9 when a recent stylus location is not available. In FIG. 10 a candidate carrier of mere noise is arbitrarily selected in stage 146. Then detection and noise subtraction are carried out over all elements of the digitizer on the basis of the selection being correct, in stage 148. In stage 150 the resulting detection pattern is analyzed. In stage 152, a decision is made as to whether the detection pattern in fact indicates a correct selection or not. If a correct selection is indicated then the results are accepted in stage 154, otherwise the results are rejected and a new arbitrary selection is made. In alternative or complimentary embodiments, either unlikely patterns are rejected, or likely patterns are positively selected.

As will be explained in greater detail below, the different elements are at different spatial locations and may have different characteristics, as a result of which the same signals may be at different phases and magnitudes. A preferred embodiment thus uses a complex proportion to compensate for either or both of phase and magnitude differences.

In one variation the digitizer is a grid array of detection elements. One of the elements is selected as the candidate carrier of mere noise using any of the methods described above or other methods that will occur to the skilled person, and then the outputs of either all or part of the other elements in the grid are reduced in accordance with the detected noise in the candidate carrier of mere noise.

In another preferred embodiment, the method involves using, not just one, but a group of arbitrarily selected frequencies to calculate the reduction. The reduction calculation may thus be based on an average output within the group.

As will be explained in greater detail below, the detecting elements may be conductive detectors of a flat array. The detected object may be a stylus but may alternatively be any moving object emitting location signals at a given frequency.

The noise is often at least in part a consequence of the presence of a finger.

As explained above, noise reduction is carried out by identifying noise levels at the stylus frequency and subtracting them from the signals received on the sensing elements or antennas sensing the stylus. To do so, the digitizer must first find an antenna exhibiting pure noise (i.e. an antenna that is least effected by the stylus), and then use the output at that antenna to calculate the noise components on the stylus-detecting antennas.

Figure 11:
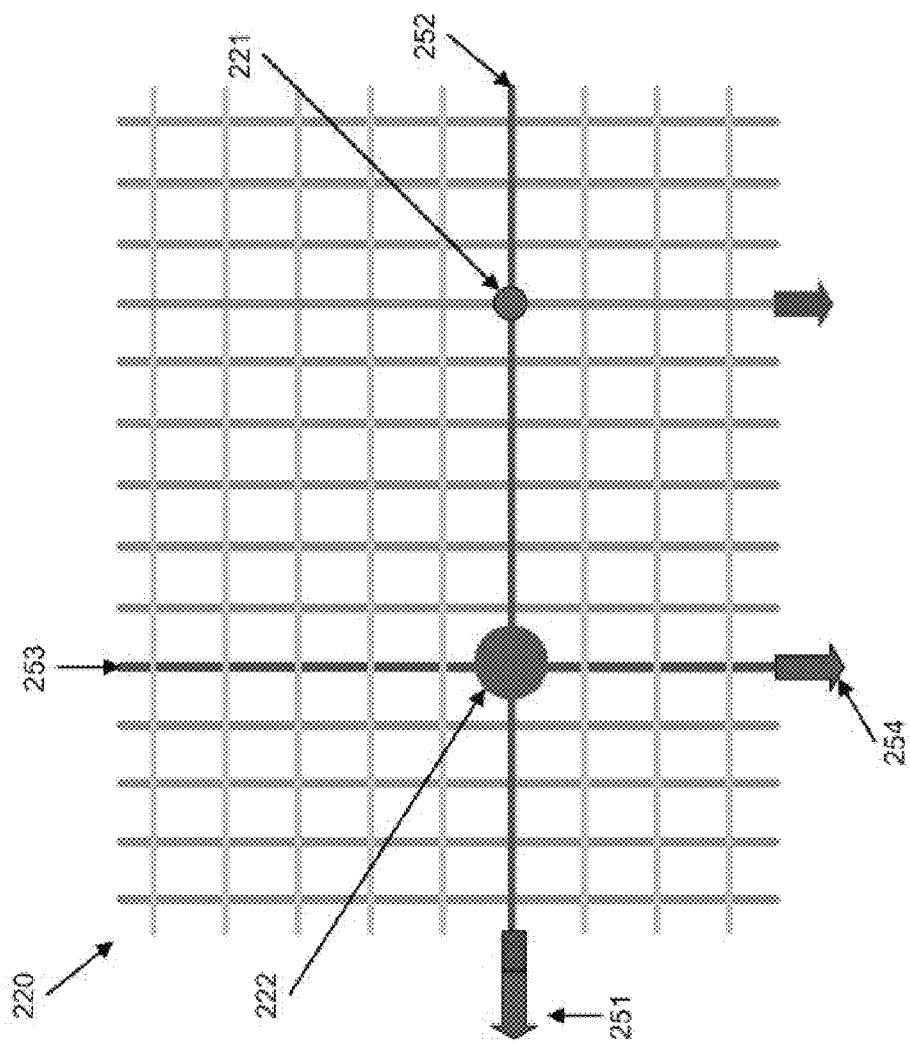
FIG. 11 is a simplified diagram illustrating operation of a digitizer according to an idealized embodiment of the present invention.

FIG. 11 is an illustration of the solution described above in an ideal digitizer system where the amplifiers are identical and have infinite input resistances. In particular the user induced signals do not suffer magnitude or phase shifts due to resistance of sensor conductors, differences in parasitic input capacitances and the like. This scenario corresponds to the simplified flow chart described in FIG. 6.

FIG. 11 shows a sensor 220 comprising a grid of detecting elements, including elements 252 and 253. A finger is at location 222 and a stylus at location 221. A mixed output 251 is obtained from detecting element 252 due to the finger and the stylus. However element 253 is not affected by the finger.

In accordance with the above assumptions, a detected noise signal induced by a user finger 222 touching two different antennas 252 and 253 is similar. The stylus antenna 252 receives signals 251 from both finger location 222 and stylus location 221. As long as both antennas 252 and 253 are sampled simultaneously the signal 254 detected on the finger antenna 253 can be subtracted from the mixed signal 251 received on the stylus antenna 252. As a result the pure stylus signal is obtained at the stylus antenna 252.

A Solution for Non-Ideal Digitizers
Detecting Noise signals

As explained above, a preferred implementation of the present invention utilizes noise signals at an arbitrary frequency, different from the stylus frequency, in order to reduce noise signals in the stylus frequency. For purposes of the present disclosure the frequency used for noise signals that are not at the stylus frequency will be referred to as $f_{arb}$. As described above, the digitizer preferably finds an antenna exhibiting pure noise signals in order to eliminate the noise signal from the stylus antenna. One way to find a pure noise antenna lies in the ability to detect noise signals in $f_{arb}$.

The noise spectrum is usually wider than the stylus frequency range; thus sampling a range of frequencies around the stylus frequency is most likely to reveal noise signals at other frequencies as well. In this case each time the digitizer samples the antennas it scans a range of frequencies around the stylus frequency. Signals received in frequencies other than the stylus frequency are evidently noise. In one embodiment, the digitizer selects a frequency showing the strongest noise level, as long as it is above a certain threshold, to be the frequency $f_{arb}$. In other embodiments, the noise frequency can be selected according to various system considerations. For example, some embodiments may implement touch detection at one frequency ($f_1$) and stylus detection at a second frequency ($f_2$). Since the system is already configured to examine signals at $f_1$, it may be preferable to utilize $f_1$ as the noise frequency ($f_{arb}=f_1$).

In some cases it is possible to deliberately generate a noise signal at a predetermined frequency ($f_{arb}$) that is induced by the same source of unwanted noise. An example for such a case is a conductive object, such as a user's finger, touching the screen and inducing noise signals. Thus, oscillating the digitizer's antennas intentionally will create finger-induced signals at the frequency of the oscillating antennas. The antenna oscillations may be at any frequency ($f_{arb}$) other than the stylus frequency. However, the best results are achieved when $f_{arb}$ is close to the stylus frequency. In this case $f_{arb}$ is determined according to the frequency utilized to generate the noise outputs as opposed to the first scenario where it is determined on the fly. Note that in most applications the stylus may oscillate at more than one frequency at different times. For example, when the stylus is hovering above the sensor it may be set to oscillate at one frequency ($f_1$) and when it is in contact with the sensor ('tip-down') it may be set to oscillate at a second frequency ($f_2$). The digitizer preferably recognizes the status of the stylus (i.e. hovering or 'tip-down') according to the frequency of the stylus signal. In this case, the selected noise frequency ($f_{arb}$) corresponds to the relevant stylus frequency. When the stylus is in the hovering state, $f_{arb}$ is close to $f_1$. When the stylus is in contact with the sensor a second noise frequency is utilized, closer to $f_2$.

Finding the Pure Noise Antenna

It is reasonable to assume that in any case when noise sources are present, the system can identify at least one antenna that exhibits pure noise signals. This assumption is based on the fact that the stylus is affecting a relatively small area in the proximity of its tip and the fact that physically the stylus and noise source cannot be located at the exact same place.

Figure 12:
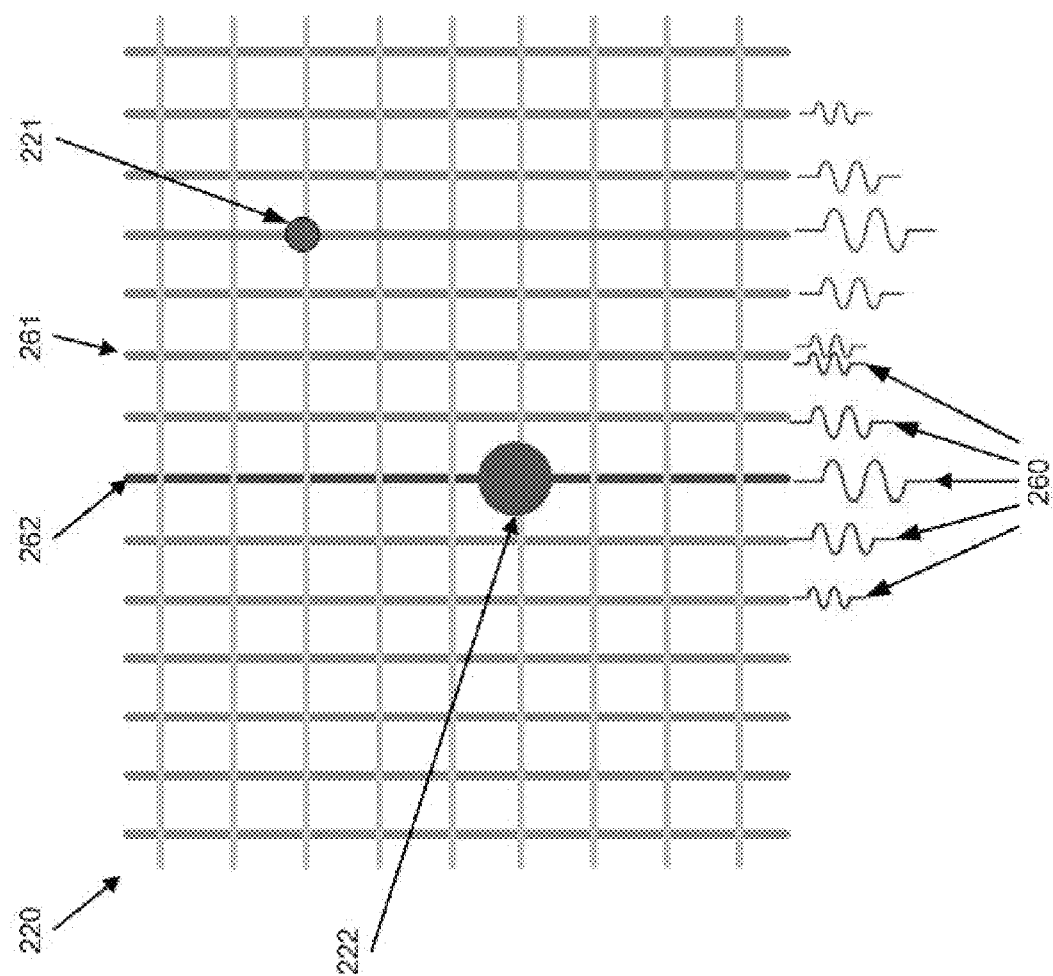
FIG. 12 is a simplified diagram illustrating operation of the digitizer of FIG. 11 in a less idealized case.

The preferred embodiments use two different methods in order to find a pure noise antenna. The first method, described above with respect to FIG. 9, is applicable only when the previous location of the stylus is known. FIG. 12 is a simplified diagram illustrating a digitizer on which is carried out the method of FIG. 9, namely of finding the pure noise antenna using the stylus' previous location. FIG. 12 shows the same grid arrangement as in FIG. 11, with a finger at one location and the stylus at another location. The method of FIG. 12 relies on the fact that the stylus movements across the sensor are continuous. In addition, the antennas sampling rate is such that the previous location of the stylus is a good indication of its current whereabouts. The following steps are used to identify the pure noise antenna:

1. Detecting antennas exhibiting noise signals in $f_{arb}$—This stage can be preformed in any of the ways described hereinabove or any other methods that may occur to the skilled person.

2. Ignore any antennas that might be used for stylus detection, such as antenna 261. The algorithm chooses the antenna farthest away from the stylus' previous location, but still exhibiting a noise signal exceeding a certain threshold. In this case antenna 262 is most likely to be chosen as it has a noise source located thereon, namely a finger.

Alternatively, the algorithm may choose the antenna exhibiting the strongest noise signal as long as it is sufficiently distanced from the stylus previous location, again as described above.

The second method, as illustrated above in FIG. 10, does not rely on the previous location of the stylus, thus it can be implemented even when the stylus is not present at the sensor surface or when a previous location is not known. The procedure of finding the noise antenna, using the second method is as follows—

1. Detecting several antennas exhibiting a strong enough noise signal in $f_{arb}$—as described hereinabove.

2. Choose one of the antennas to calculate the noise component in the stylus frequency on all the other antennas, as described elsewhere herein. The choice may be made arbitrarily or using any suitable algorithm.

3. If there is no stylus in the region of the sensor then the selected antenna must exhibit a pure noise signal and after subtraction all other signals will be very low. On the other hand, if there is a stylus detected by the sensor, there are two options:

> The selection was correct and the chosen antenna exhibit pure noise signals. In this case the noise is subtracted from all other antennas and the stylus is detected correctly.
>
> The selection was wrong and the chosen antenna exhibits a mixed output of noise and of stylus signal. In such a case, after subtraction of the incorrect pure noise elements from all the other antennas, the pattern of signals exhibited on the entire sensor will not match the kind of pattern induced by a real stylus. For example, a pattern may be considered invalid if the number of antennas exhibiting stylus signals is above a certain threshold. An invalid pattern can also be identified by the distance between the stylus antennas, according to the spatial EM field emitted from the stylus tip.

The system thus identifies an invalid pattern and goes on to select a further candidate for being a pure noise antenna, preferably the antenna exhibiting the largest noise signal ($f_{arb}$) on the other axis. Noise is subtracted from all other antennas and the system looks for a valid stylus pattern. This process of antenna selection and noise subtraction is repeated until choosing a real pure noise antenna thus detecting a valid stylus pattern after noise subtraction.

Figure 13:
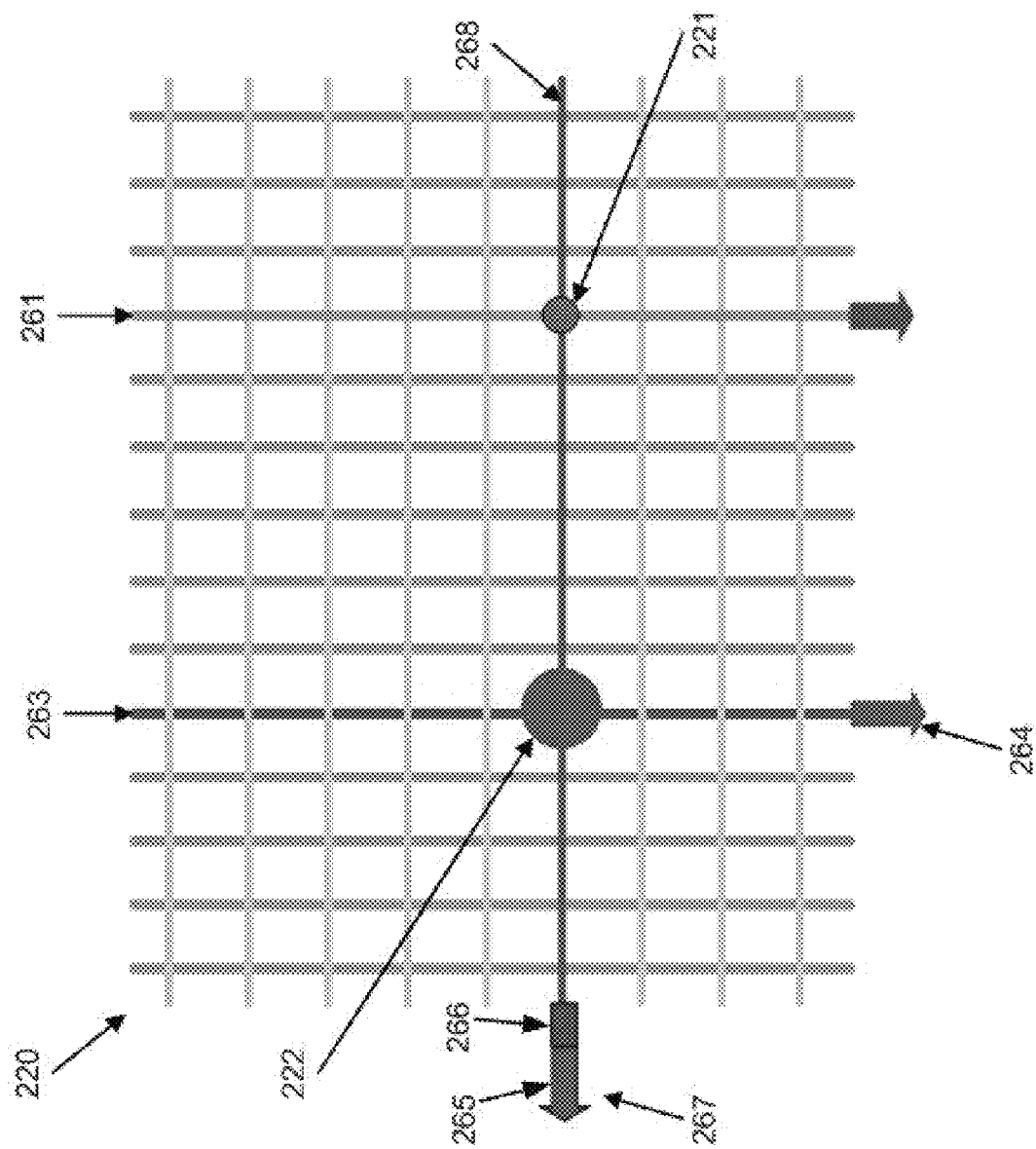
FIG. 13 is a simplified diagram illustrating operation of a digitizer according to a preferred embodiment of the present invention in which the method of FIG. 10 is used to identify a candidate carrier of pure noise.

Reference is now made to FIG. 13 which illustrates the grid of FIG. 11 on which the method of FIG. 10 is being carried out. In FIG. 13 the digitizer identifies antenna 268 which is the antenna exhibiting a large noise signal on the X axis. The digitizer further identifies antenna 263 exhibiting a large noise signal on the Y axis. FIG. 13 clearly shows that only antenna 263 is exhibiting pure noise, output 264. Antenna 268 by contrast exhibits a mixed signal 267 including elements from both noise source 265 and a stylus 266.

The algorithm chooses one of the noise antennas as a pure noise antenna and uses it to calculate the noise component in the stylus frequency on all the other antennas, as described hereinbelow. As will be explained below, the antennas affected by these calculations are those exhibiting noise signals in $f_{arb}$. For example, the stylus antenna 261 is unaffected by the noise source, therefore its signals are not altered.

Figure 14:
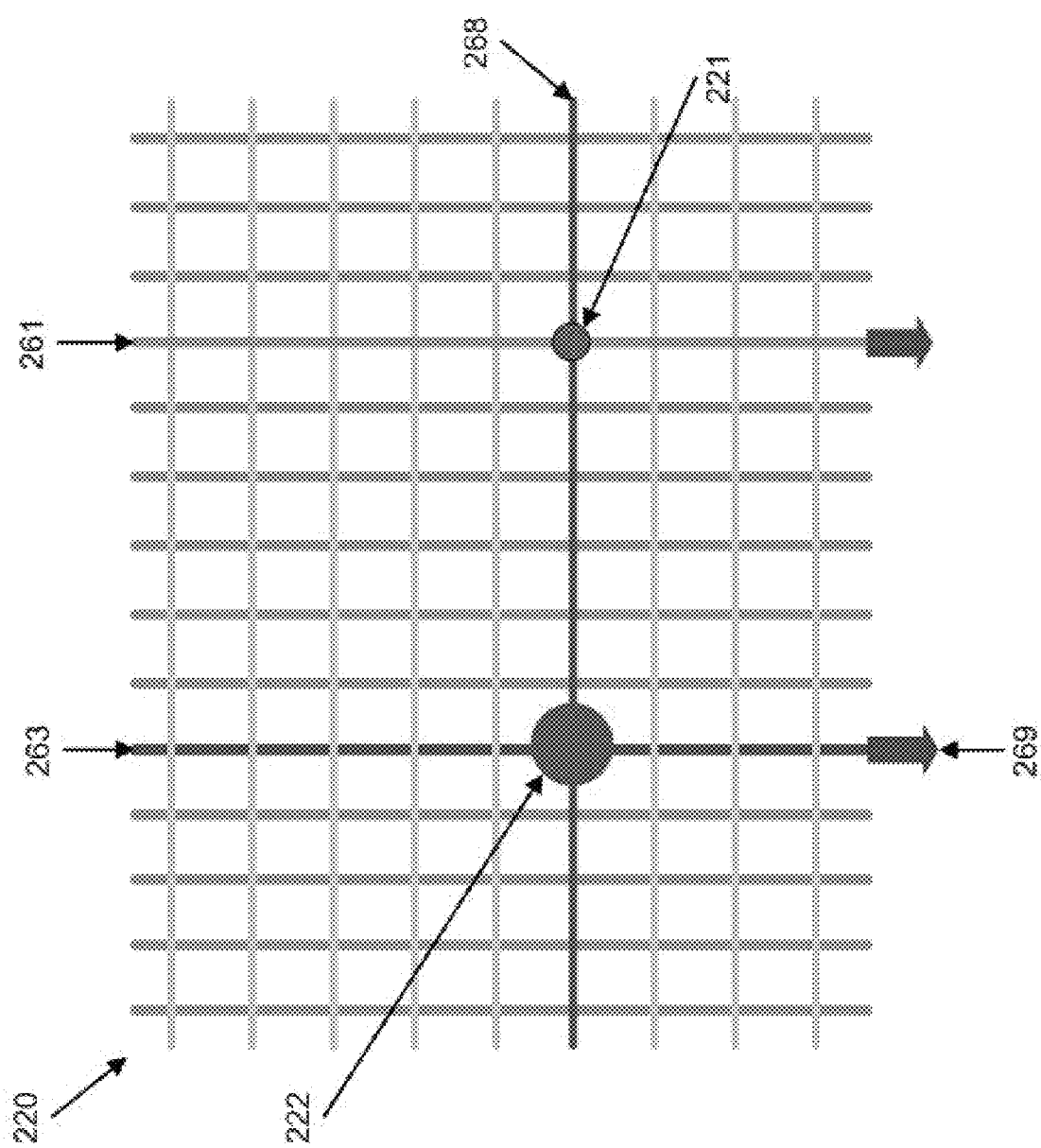
FIG. 14 is a simplified diagram illustrating the operation of FIG. 10 in an alternative outcome.

Now we review the case when the algorithm chooses the antenna 268 exhibiting mixed signals 267 instead of the antenna 263 exhibiting pure noise 264. As a result of choosing the wrong antenna the digitizer will not be able to determine the stylus position. Referring now to FIG. 14, we describe the signals received at antenna 263 and antenna 268 after subtracting the mixed signals 267 on the chosen noise antenna (68). Antenna 268 does not exhibit any signals in the stylus frequency while antenna 263 exhibits a signal 269 at the stylus frequency. These indications imply that the stylus affects only one axis, and thus its location cannot be determined.

Since the stylus cannot in reality only affect a single axis an erroneous selection of the noise antenna is a clear conclusion. The algorithm thus proceeds to choose the noise antenna on the other axis as the pure noise antenna.

For purposes of the present disclosure the antenna exhibiting pure noise signals is referred to hereinbelow as the 'Noise Antenna'.

When the previous location of the stylus is unknown, the noise removal algorithm may consist of several iterations. In this case it would be preferable to avoid unnecessary processing, and issue the noise removal algorithm only when there is high certainty that a stylus is indeed present. Once an antenna exhibits a strong enough signal in the stylus frequency, the digitizer compares the signals at the stylus frequency ($f_s$) to signals received at the noise frequency ($f_{arb}$). The algorithm checks the following ratio—

$$\frac{Mag(f_{arb}, X) \cdot Mag(f_{arb}, Y)}{Mag(f_s, X) \cdot Mag(f_s, Y)} \overset{?}{>} \text{Threshold}$$

Where, Mag($f_{arb}$, X) is the magnitude of the signal in the noise frequency ($f_{arb}$), received on the antenna exhibiting the strongest signal on the X axis.

Mag($f_{arb}$, Y) is the magnitude of the signal in the noise frequency ($f_{arb}$), received on the antenna exhibiting the strongest signal on the Y axis.

Mag($f_s$, X)—The magnitude of the signal in the stylus frequency ($f_s$), received on the antenna exhibiting the strongest signal on the X axis.

Mag($f_s$, Y)—The magnitude of the signal in the stylus frequency ($f_s$), received on the antenna exhibiting the strongest signal on the Y axis.

As stated above, the ratio is calculated using the antennas exhibiting the highest signals on each axis. When the ratio exceeds a certain predetermined threshold it means that the signals are most likely originating from noise in the stylus frequency rather than a stylus. In this case the signals are preferably discarded.

Proportion Coefficient Between a Pair of Antennas

As explained above, when a signal is induced by a single source, the digitizer may sense that signal in a different magnitude or phase on different antennas. Some of the reasons for the differences in phase and magnitude are:

The distance of the signal source form the different antennas

The fact that the amplifiers at the end of the antennas are not necessarily identical, they may for example have different input resistances.

The different locations of the signal source in respect to the inputs to the amplifiers.

Since the preferred embodiments utilize the signal received on one antenna to calculate the signal received on a second antenna, it is important to compensate for the variations in phase and magnitude. To do so a complex proportion coefficient is preferably used to correlate between signals received on the different antennas.

Figure 15:
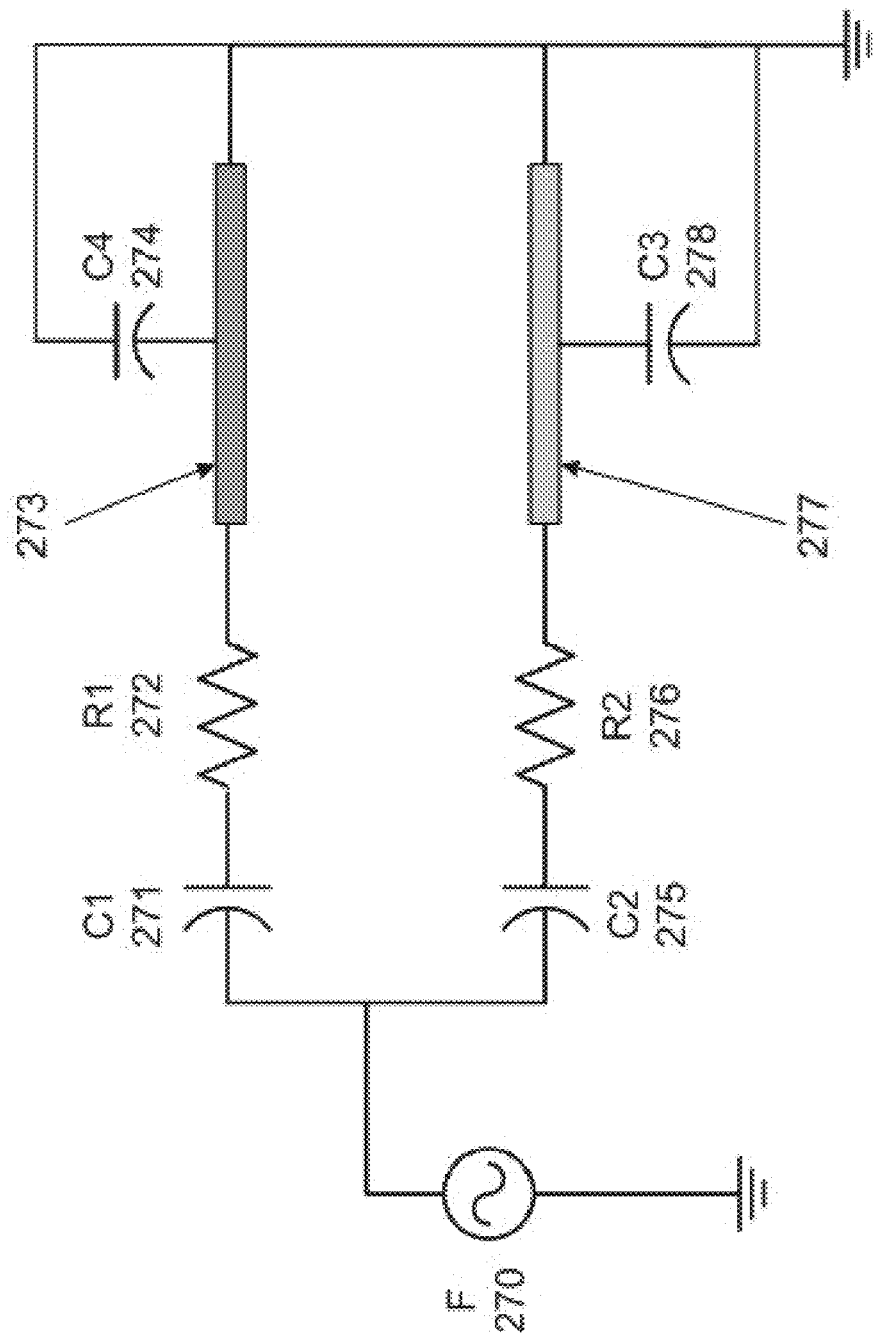
FIG. 15 is a simplified diagram showing the equivalent components that contribute to noise detected by the digitizer.

Reference is now made to FIG. 15 which is a simplified circuit equivalent showing two antennas, 273 and 277, being affected by a single oscillating source 270 which represents a user finger. Each antenna 273, 277, is connected to the oscillating source 270 through a different set of resistors and capacitors. Capacitor C1 271 represents the capacitance between the user's finger 270, and antenna 273. Resistor R1 272 represents the internal resistance of antenna 273. Capacitor C2 275 represents the capacitance between the user's finger 270 and antenna 277. Resistor R2 276 represents the internal resistance of the second antenna 277. Capacitors C3 278 and C4 274 represent the parasitic capacitance between the antennas and the surrounding components. It will be apparent that since the antennas have different characteristics and locations they are affected differently by the oscillating source.

The signal at first antenna 273 may be expressed as—$S_1 = Z1 \cdot F$.

where F is the signal induced by the finger and Z1 is a complex number representing the phase shift and magnitude change due to capacitors C1 C4 and resistor R1. Z1 also incorporates the phase shift and magnitude change due to the distance of the finger from the first antenna 273.

The signal on the second antenna 277 may be expressed as—$S_2 = Z2 \cdot F$ where F is the signal induced by the finger and Z2 is a complex number representing the phase shift and magnitude change due to capacitors C2 C3 and resistor R2. Z2 also incorporates the phase shift and magnitude change due to the distance of the finger from the second antenna 277.

Dividing the above equations gives a proportion coefficient (C=Z1/Z2) that can be used to reduce the signal on one antenna ($S_1$) based on the signal received on a second antenna ($S_2$) as follows:

$$\frac{S_1}{S_2} = \frac{Z1}{Z2} \Rightarrow S_1 = \frac{Z1}{Z2} \cdot S_2 \Rightarrow S_1 = C \cdot S_2 \qquad \text{Equation 1}$$

Since Z1 and Z2 are complex numbers, their ratio is also a complex number representing the phase shift and magnitude difference between the signals received in the first antenna 273 and the second antenna 277.

The phase shift is calculated by subtracting the phase part of Z2 from the phase part of Z1—The magnitude difference is calculated by the ratio between the magnitude parts of Z1 and Z2—

$$MAG\{C\} = \frac{MAG\{Z1\}}{MAG\{Z2\}}.$$

The proportion coefficient (C) is a function of many parameters such as the distance between the antennas and the signal's source, the resistances of the antennas, environmental conditions, different parasitic capacitances on each antenna etc. However, for a small enough frequency range the proportion coefficient is unchanged. Thus, the same proportion coefficient can be used when sampling signals of close frequencies on the same pair of antennas, at the same time. It is also possible to establish one proportion coefficient ($C_1$), corresponding to a first range of frequencies around $f_1$, from a second proportion coefficient ($C_2$), corresponding to a second range of frequencies around $f_2$.

Figure 16:
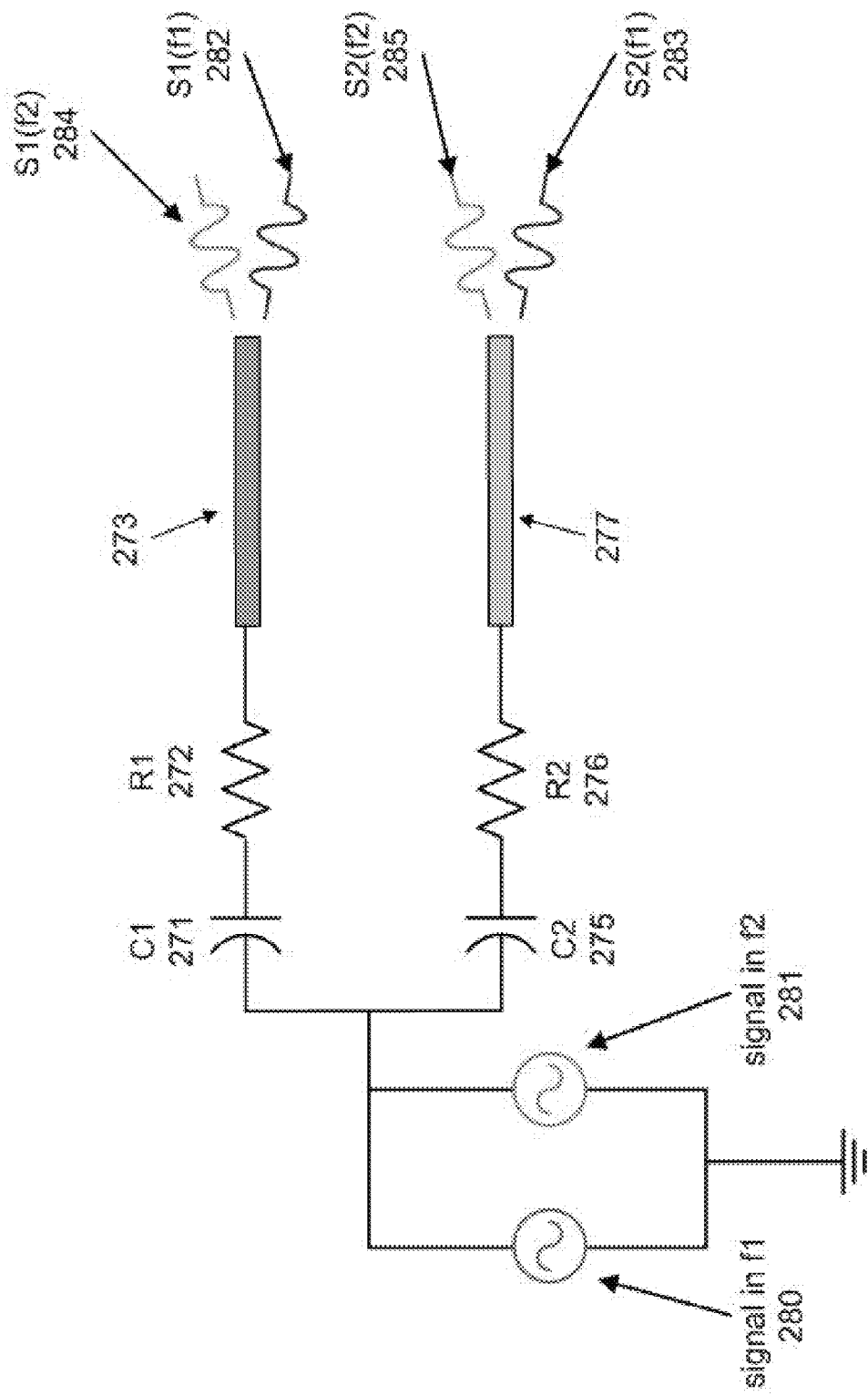
FIG. 16 is a simplified diagram showing how the situation shown in FIG. 15 varies for two noise sources.

Referring now to FIG. 16, which is a simplified diagram showing two sources, 280 and 281, oscillating at close but different frequencies, $f_1$ and $f_2$, affecting a pair of antennas 273 and 277. Parts that are the same as in previous figures are given the same reference numerals and are not referred to again except as necessary for understanding the present embodiment.

The oscillating signals 280 and 281 oscillate at two different yet relatively close frequencies—$f_1$ and $f_2$. The oscillating energy is transmitted to the antennas through the equivalent of a set of resistors and capacitors as previously described in FIG. 16. Signals induced by first oscillator 280 are received on first antenna 273 as signal $S_1(f_1)$ 282 and as signal $S_2(f_1)$ 283 on second antenna 277. Signals induced by the second oscillator 281 are received on first antenna 273 as signal $S_1(f_2)$ 284 and as signal $S_2(f_2)$ 285 on second antenna 277. The oscillating frequencies are such that the same proportion coefficient can be used for signals at both frequencies.

As long as the above signals are sampled at the same time, a proportion coefficient can be used for calculating signals received on the first antenna by sampling the signals received on the second antenna:

$$S_1(f_1) = C \cdot S_2(f_1) \quad \text{Equation 2}$$

$$S_1(f_2) = C \cdot S_2(f_2) \quad \text{Equation 3}$$

Since the proportion coefficient is approximately the same for both of the above equations—

$$\frac{S_1(f_1)}{S_1(f_2)} = \frac{S_2(f_1)}{S_2(f_2)} \quad \text{Equation 4}$$

The present invention uses Equation 4 in order to calculate the noise component on the stylus frequency as will be elaborated hereinbelow.

Subtracting the Noise Component from the Stylus Signal

The present embodiments may be implemented on any antenna, whether or not it exhibits a stylus signal. It is possible to calculate the pure noise signal on each and every antenna and subtract it from the overall signal received on said antenna. When a stylus signal is indeed present, the result will be a pure stylus signal. When the antenna is unaffected by the stylus the subtraction of the pure noise signal will indicate that no signals are present on the antenna. In both cases precise detection of the stylus is achieved.

Figure 17:
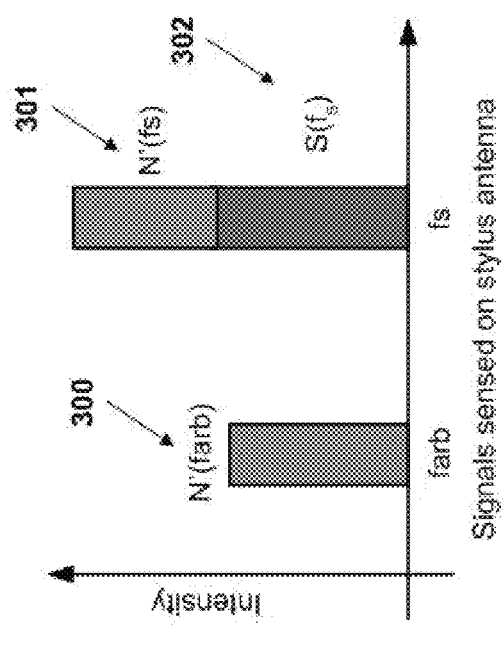
FIGS. 17 and 18 are two graphs illustrating signals sampled at antennas according to preferred embodiments of the present invention.

The above principle is now explained using one antenna exhibiting mixed stylus and noise signals and another antenna exhibiting pure noise signals. Reference is now made to FIG. 17, which is a graph showing intensity vs. frequency of the signals sampled on one of the antennas sensing mixed stylus and noise signals. This antenna is now referred to as the stylus antenna.

The pure noise signal in $f_{arb}$ received on the stylus antenna is marked $N'(f_{arb})$ 300. The pure noise component induced by the noise source in the stylus frequency is $N'(f_s)$ 301. The pure stylus signal is marked $S(f_s)$ 302. Noise removal according to the present embodiments comprises distinguishing between $N'(f_s)$. Note that the noise reduction algorithm can be applied even if $S(f_s)=0$.

Figure 18:
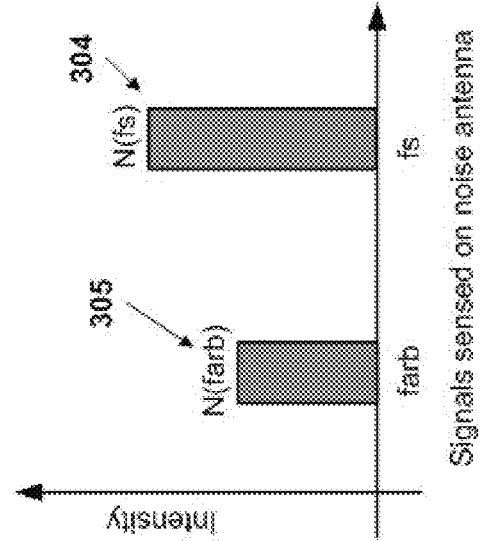

Reference is now made to FIG. 18 which describes the signals sampled on an antenna that is unaffected by the stylus. This antenna is referred to as the pure noise antenna, since it exhibits noise signals alone. The signal received on the pure noise antenna in $f_{arb}$ is marked $N(f_{arb})$ 305. The pure noise signal received on the noise antenna in the stylus frequency is marked $N(f_s)$ 304.

The intensity of the signals is arbitrary, and used for illustrating the kinds of signals received on each antenna. The present embodiments identify $N'(f_s)$ 301 in order to subtract it from the signals received on the antenna sensing the stylus FIGS. 17 and 18 describe stylus induced signals on one specific antenna. However, the method can be implemented on any antenna or group of antennas.

Signals $N(f_{arb})$, $N'(f_{arb})$ and $N(f_s)$ are sampled simultaneously, hence (based on equation 4)—

$$\frac{N(f_{arb})}{N'(f_{arb})} = \frac{N(f_s)}{N'(f_s)} \quad \text{Equation 5}$$

The frequency chosen for detecting the noise signals is preferably different from the frequency currently used by the stylus yet close enough for equation 4 to remain valid.

Notice that the only unknown parameter in equation 5 is $N'(f_s)$, therefore—

$$N'(f_s) = \frac{N'(f_{arb})}{N(f_{arb})} \cdot N(f_s) \quad \text{Equation 6}$$

Once $N'(f_s)$ calculated it is subtracted from the signal received on the stylus antenna revealing the signal induced by the stylus alone $S(f_s)$.

Improving the Proportion Coefficient Calculations

The preferred embodiments use the ratio between detections at the pure noise antenna and detections received on other antennas at different frequencies in order to calculate the noise component on the stylus frequency as explained.

Averaging Over Several Arbitrary Frequencies

The embodiments of the present invention described above use one arbitrary frequency in order to calculate the above ratio. However, in an alternative embodiment several frequencies are used, and an average is taken of the detections induced on the respective antennas for the different frequencies. The use of more than one arbitrary frequency reduces the proportion coefficient dependence on frequency.

The digitizer according to this embodiment thus uses different arbitrary frequencies ($f^1_{arb}, f^2_{arb}, \ldots, f^n_{arb}$) in order to detect noise signals in several frequencies. The noise signals themselves are detected as described hereinabove.

Sampling the conductive lines provides detections at frequencies—$f^1_{arb}, f^2_{arb}, \ldots, f^n_{arb}$.

The average output received on a stylus antenna due to finger noise alone is—

$$\overline{N}'(f_{arb}) = \frac{\sum_{i=1}^{n} N'(f^i_{arb})}{n}.$$

The average output received on the noise antenna due to finger noise is—

$$\overline{N}(f_{arb}) = \frac{\sum_{i=1}^{n} N(f^i_{arb})}{n}.$$

Since all detections are sampled simultaneously, the ratio between the averaged signals and the signals received at the stylus frequency is—

$$\frac{\overline{N}(f_{arb})}{\overline{N}'(f_{arb})} = \frac{N(f_s)}{N'(f_s)} \qquad \text{Equation 7}$$

Once again, the only unknown parameter is $N'(f_s)$, hence—

$$N'(f_s) = \frac{\overline{N}'(f_{arb})}{\overline{N}(f_{arb})} \cdot N(f_s) \qquad \text{Equation 8}$$

The stylus signal, $S(f_s)$, is then calculated by subtracting $N'(f_s)$ from the signal received on the stylus antenna.

It is expected that during the life of this patent many relevant stylus devices and digitizer systems will be developed and the scope of the corresponding terms herein, is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for noise reduction in a digitizer, the digitizer comprising a plurality of detecting elements spread over a sensing surface for detecting an electromagnetic signal and finger touch, the method comprising:
    sampling at least two detecting elements from the plurality of detecting elements substantially simultaneously to obtain output from each of the at least two detecting elements;
    selecting as a candidate carrier of mere noise, at least one detecting element from the at least two detecting elements providing output above a defined threshold in at least one frequency used for finger touch detection;
    selecting at least one other detecting element of the at least two detecting elements as a candidate carrier of a stylus signal providing output in a known frequency of emission of a stylus;
    selecting a frequency for estimating a noise level at the known frequency of emission of the stylus;
    determining an output level provided by each of the at least two detecting elements in the selected frequency and in the known frequency of emission of a stylus; and
    reducing the output level provided by the at least one other detecting element selected as the candidate carrier of the stylus signal in accordance with the output level on the at least one detecting element selected as the candidate carrier of mere noise.

2. The method of claim 1, wherein the at least one frequency used to select the candidate carrier of mere noise is a frequency used for finger touch detection that provided a highest output level in the output sampled.

3. The method of claim 1, comprising:
    determining a ratio between output level in the frequency selected at said candidate carrier of mere noise and said candidate carrier of the stylus signal,
    from the ratio and the output level in the known frequency of emission of the stylus at the candidate carrier of the stylus signal, determining a noise level at the known frequency of emission of the stylus at said candidate carrier of the stylus signal, and
    reducing output level at the known frequency of emission of the stylus at said candidate carrier of a stylus signal in accordance with the-noise level determined at the known frequency of emission of the stylus.

4. The method of claim 3, wherein said ratio is a complex proportion to compensate for at least one of phase and magnitude differences between respective detecting elements during said reducing.

5. The method of claim 3, comprising detecting output level in a plurality of frequencies, and calculating an average ratio in accordance with said output level of said plurality of frequencies to reduce the output level of the known frequency of emission of the stylus at the candidate carrier of the stylus signal.

6. The method of claim 3, further comprising deliberately generating noise at the frequency selected for estimating the noise level at the known frequency of emission of the stylus.

7. The method of claim 1, wherein the known frequency of stylus emission is changed to a new frequency during use, the method comprising changing said frequency selected.

8. The method of claim 1, wherein said candidate carrier of mere noise is selected as a detecting element exhibiting a strongest noise signal as long as it is beyond a determined distance from the location of the candidate carrier of the stylus signal.

9. The method of claim 1, wherein said candidate carrier of mere noise is selected as the detecting element from the detecting elements identified that is furthest away from the location of the candidate carrier of the stylus signal.

10. The method of claim 1, wherein:
said candidate carrier of mere noise is selected,
noise reduction is carried out over a group of detecting elements from the plurality of detection elements on the basis of said selection being correct,
a resulting signal pattern over said group of elements is analyzed, and
said selection is allowed if said resulting signal pattern is indicative of a correct selection, otherwise a new selection of candidate carrier of mere noise is made.

11. The method of claim 1, comprising sampling a group of detecting elements from the plurality of the detecting elements, selecting at least one detecting element which is least affected by the stylus and reducing respective output levels from other detecting elements of the plurality of the detecting elements in accordance with the output level of the at least one detecting element selected.

12. The method of claim 1, wherein the plurality of detecting elements is conductive detectors arranged in an array associated with said digitizer.

13. The method of claim 1, wherein said digitizer comprises a detection surface for carrying said detecting elements, said detecting surface further being touch sensitive.

14. The method of claim 1, wherein said detecting elements are transparent conductors.

15. The method of claim 1, wherein one of the plurality of detecting elements is selected as a candidate carrier of a gaming piece signal.

16. The method of claim 1, wherein said stylus comprises an active oscillator and an energy pick up circuit.

17. The method of claim 1, wherein said stylus comprises a resonance circuit.

18. The method of claim 1, wherein said detecting elements are arranged in a grid array.

19. The method of claim 1, wherein said detecting elements are loop elements.

20. The method of claim 1, wherein the selected frequency is a frequency used for finger touch detection.

* * * * *